(12) United States Patent
Golla et al.

(10) Patent No.: US 11,805,013 B2
(45) Date of Patent: Oct. 31, 2023

(54) PRIORITIZING POLICY INTENT ENFORCEMENT ON NETWORK DEVICES

(71) Applicant: Juniper Networks, Inc., Sunnyvale, CA (US)

(72) Inventors: Krishna Mohan Golla, Bangalore (IN); Nagaraja Manikkar Shenoy, Bangalore (IN); Samta Rangare, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/776,018

(22) Filed: Jan. 29, 2020

(65) Prior Publication Data
US 2021/0234754 A1 Jul. 29, 2021

(51) Int. Cl.
*H04L 41/0816* (2022.01)
*G06F 8/70* (2018.01)
(Continued)

(52) U.S. Cl.
CPC ............ *H04L 41/0816* (2013.01); *G06F 8/70* (2013.01); *H04L 43/0876* (2013.01); *H04L 67/10* (2013.01)

(58) Field of Classification Search
CPC . H04L 41/0816; H04L 43/0876; H04L 67/10; H04L 41/0889; H04L 41/0806; H04L 41/5051; H04L 41/5058; H04L 41/0893; H04L 41/0813; H04L 41/0895; G06F 8/70
See application file for complete search history.

(56) References Cited

U.S. PATENT DOCUMENTS 9,247,455 B2 1/2016 Luna et al.
9,449,033 B2 9/2016 Kache et al.
(Continued)

FOREIGN PATENT DOCUMENTS

CN 107832141 A 3/2018
CN 106664256 B 8/2020

OTHER PUBLICATIONS

Harrington et al., "An Architecture for Describing Simple Network Management Protocol (SNMP) Management Frameworks," RFC 3411, Network Working Group, Dec. 2002, 65 pp.
(Continued)

*Primary Examiner* — Adil Ocak
(74) *Attorney, Agent, or Firm* — Shumaker & Sieffert, P.A.

(57) ABSTRACT

A controller device manages a plurality of network devices arranged at a plurality of sites. The controller device includes one or more processing units configured to determine a stateful intent for managing a software application at the plurality of network devices and represented by a graph model and translate the stateful intent into low-level configuration data. The one or more processing units are further configured to determine, for each site, a priority index based on a site-level usage of the software application, determine, an ordered list of the plurality of sites based on the priority index for each respective site, and configure, for each respective site, and in an order specified by the ordered list of the plurality of sites, one or more network devices of the plurality of network devices that are arranged at the respective site according to the low-level configuration data.

18 Claims, 18 Drawing Sheets

(51) Int. Cl.
*H04L 43/0876* (2022.01)
*H04L 67/10* (2022.01)

(56) References Cited

U.S. PATENT DOCUMENTS

| | | | |
|---|---|---|---|
| 10,200,290 | B2 | 2/2019 | Kellerman et al. |
| 10,355,969 | B2 | 7/2019 | Shaikh et al. |
| 10,516,761 | B1 | 12/2019 | A et al. |
| 2003/0163557 | A1* | 8/2003 | Zollner .................... G06F 1/24 719/318 |
| 2005/0091651 | A1* | 4/2005 | Curtis ....................... G06F 8/65 717/174 |
| 2007/0268514 | A1 | 11/2007 | Zeldin et al. |
| 2008/0091838 | A1* | 4/2008 | Miceli ................... H04L 47/801 709/231 |
| 2012/0023546 | A1* | 1/2012 | Kartha .................. H04L 63/104 726/1 |
| 2012/0109716 | A1* | 5/2012 | Giat .................... G06Q 30/0206 702/45 |
| 2013/0246996 | A1* | 9/2013 | Duggal ..................... G06F 8/35 717/104 |
| 2014/0173111 | A1* | 6/2014 | Varner ................. H04L 63/101 709/225 |
| 2016/0080211 | A1 | 3/2016 | Anand et al. |
| 2016/0080502 | A1* | 3/2016 | Yadav ..................... H04L 45/28 709/227 |
| 2017/0054758 | A1* | 2/2017 | Maino .................... H04L 45/64 |
| 2017/0063705 | A1 | 3/2017 | Gilson et al. |
| 2017/0126740 | A1 | 5/2017 | Bejarano Ardila et al. |
| 2017/0295114 | A1 | 10/2017 | Goldberg et al. |
| 2018/0081670 | A1 | 3/2018 | Caushi et al. |
| 2018/0276689 | A1* | 9/2018 | Zhang ................ G06Q 30/0201 |
| 2020/0326924 | A1* | 10/2020 | A ........................... H04L 41/12 |

OTHER PUBLICATIONS

Bjorklund, "YANG—A Data Modeling Language for the Network Configuration Protocol (NETCONF)," Internet Engineering Task Force (IETF), RFC 6020, Oct. 2010, 174 pp.

Enns, "NETCONF Configuration Protocol," Network Working Group, RFC 4741, Dec. 2006, 96 pp.

U.S. Appl. No. 16/282,160, filed Feb. 21, 2019, Juniper Networks, Inc. (inventor: A et al.) entitled "Supporting Compilation and Extensibility on Unified Graph-Based Intent Models".

Extended Search Report from counterpart European Application No. 20170762.7, dated Sep. 22, 2020, 11 pp.

Response to Extended Search Report dated Sep. 22, 2020, from counterpart European Application No. 20170762.7 filed Feb. 1, 2022, 87 pp.

Communication pursuant to Article 94(3) EPC from counterpart European Application No. 20170762.7 dated Feb. 20, 2023, 12 pp.

First Office Action and Search Report, and translation thereof, from counterpart Chinese Application No. 202010320867.0 dated Apr. 8, 2023, 21 pp.

Response to Communication pursuant to Article 94(3) EPC dated Feb. 20, 2023, from counterpart European Application No. 20170762.7 filed Jun. 16, 2023, 18 pp.

* cited by examiner

PRIORITIZING POLICY INTENT ENFORCEMENT ON NETWORK DEVICES

TECHNICAL FIELD

This disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "policy intent" or simply "intents" or "policies." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred to herein as a controller device, may configure network devices using low-level (e.g., device-level) configuration data. Moreover, the controller device may manage the network devices based on the low-level configuration data for the network devices. According to the techniques of this disclosure, the controller device may be configured to determine site-level usage of a software application. In this example, the controller device may be configured to prioritize applying low-level configuration data to sites based on the site-level usage of the software application. In this way, the controller device may apply low-level configuration data for a software application to network devices at sites that are likely to use the software application before applying the low-level configuration data to network devices at sites that are unlikely to use the low-level configuration data for the software application.

Techniques described herein may help to improve a performance of a network. For example, a controller device may be configured to determine, for each respective site of the plurality of sites, a priority index based on a site-level usage of the software application at the respective site. In this example, the controller device may determine an ordered list of sites based on the priority index for each respective site. Configuring network devices at sites in the order specified by the ordered list may cause the network to effectively configure the network devices of the network faster than systems that do not use an ordered list of sites.

In one example, a method includes: determining, by a controller device that manages a plurality of network devices arranged at a plurality of sites, a stateful intent for managing a software application at the plurality of network devices and represented by a graph model; translating, by the controller device, the stateful intent into low-level configuration data for configuring the plurality of network devices; determining, by the controller device, for each respective site of the plurality of sites, a priority index based on a site-level usage of the software application at the respective site; determining, by the controller device, an ordered list of the plurality of sites based on the priority index for each respective site of the plurality of sites; and configuring, by the controller device, for each respective site of the plurality of sites, and in an order specified by the ordered list of the plurality of sites, one or more network devices of the plurality of network devices that are arranged at the respective site according to the low-level configuration data.

In another example, a controller device that manages a plurality of network devices arranged at a plurality of sites includes one or more processing units implemented in circuitry and configured to: determine a stateful intent for managing a software application at the plurality of network devices and represented by a graph model; translate the stateful intent into low-level configuration data for configuring the plurality of network devices; determine, for each respective site of the plurality of sites, a priority index based on a site-level usage of the software application at the respective site; determine, an ordered list of the plurality of sites based on the priority index for each respective site of the plurality of sites; and configure, for each respective site of the plurality of sites, and in an order specified by the ordered list of the plurality of sites, one or more network devices of the plurality of network devices that are arranged at the respective site according to the low-level configuration data.

In one example, a computer-readable storage medium includes stored thereon instructions that, when executed, cause one or more processing units of a controller device that manages a plurality of network devices arranged at a plurality of sites to: determine a stateful intent for managing a software application at the plurality of network devices and represented by a graph model; translate the stateful intent into low-level configuration data for configuring the plurality of network devices; determine, for each respective site of the plurality of sites, a priority index based on a site-level usage of the software application at the respective site; determine, an ordered list of the plurality of sites based on the priority index for each respective site of the plurality of sites; and configure, for each respective site of the plurality of sites, and in an order specified by the ordered list of the plurality of sites, one or more network devices of the plurality of network devices that are arranged at the respective site according to the low-level configuration data.

The details of one or more examples are set forth in the accompanying drawings and the description below. Other features, objects, and advantages will be apparent from the description and drawings, and from the claims.

DETAILED DESCRIPTION

Figure 1:
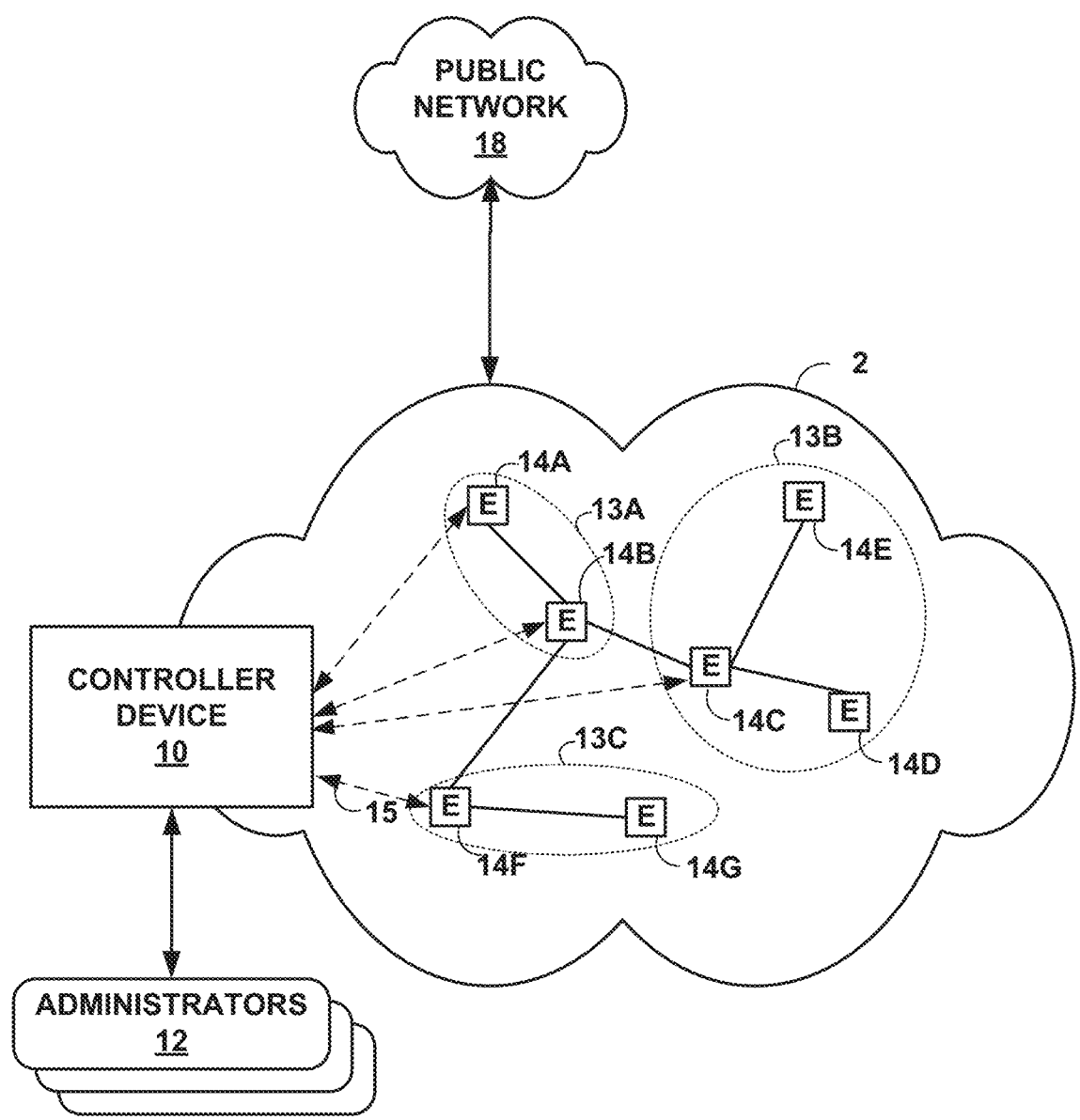
FIG. 1 is a block diagram illustrating an example including elements of an enterprise network that are managed using a management device.

In some controller devices, intent policies, such as, for example, a software-defined wide-area network (SD-WAN), or a firewall, may be deployed on to a plurality of sites simultaneously. When relatively large number of sites are involved, such controller devices may deploy the intent policies in batches. For example, if there are 1,000 sites, such controller devices divide the 1,000 sites into batches of 20 sites. In this example, if each batch takes up to 3 to 4 minutes for deployment of the intent policy, such controller devices may take hours to complete deployment on all 1,000 sites. In some applications, controller devices may be configured to support over 7,500 sites. As such, there may be significant delay in applying an intent policy to all sites.

However, such controller devices may apply intent policies on sites which are not critical or which might not have much impact of the policy being deployed over critical sites which may benefit from the policies being applied immediately. In an example network, only 10 sites of 1,000 sites (e.g., 1% usage) may be using a particular software application. In this example network, prioritizing the 10 sites using the particular application may help to improve a user experience of the example network. For instance, if an administrator wants to deny one particular application across all the sites immediately or change a traffic steering profile for any particular software application, such controller devices may spend valuable time and resources deploying the policy intent on sites which are less likely to use the particular application and delay the deployment on sites where the probability of using the particular software application is high. Additionally, if there are any sites that are of low priority and have delayed response to controller device, the controller device may spend a considerable amount of time retrying failed deployments due to the delayed response by the underlying network device in responding to the controller device.

In accordance with the techniques of the disclosure, a controller device may be configured to "learn" site-level usage of applications. For example, the controller device may be configured to determine site-usage of software applications at different time stamps and frequencies using a history of network logs (e.g., syslogs) and/or application logs (e.g., AppTrack logs) accumulated over a period of time. With this available historical traffic data and details of each site, the controller device may re-arrange and prioritizes the sites dynamically for policy intent deployment based on the application selected and the time at which the job is scheduled.

Techniques described herein may help customers facing scale and performance issues, by, for example, prioritizing and ordering sites with network devices for applying configuration changes. In some examples, a controller device may be configured to continuously learn and correlate the data analyzed from the network. As such, the controller device may be configured to dynamically prioritize sites in an order at which the deployment has to be done based on a change in a traffic trend. For example, the controller device may be configured to dynamically prioritize sites in an order at which the deployment has to be done based on region specific applications and/or threats. In some examples, the controller device may be configured to dynamically prioritize sites in an order at which the deployment has to be done based on a time-zone specific maintenance window for applying critical patches and/or policies. The controller device may be configured to apply similar techniques for other functionalities, such as, but not limited to, a disk image upgrade on a network device or another functionality.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as "network devices" or "remote network devices") may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the asynchronous transfer mode (ATM) protocol, or a datagram defined by the user datagram protocol (UDP). Communication links interconnecting elements 14 may be physical links (e.g., optical, copper, and the like), wireless, or any combination thereof.

Enterprise network 2 is shown coupled to a public network 18 (e.g., the Internet) via a communication link. Public network 18 may include, for example, one or more client computing devices. Public network 18 may provide access to web servers, application servers, public databases, media servers, end-user devices, and other types of network resource devices and content.

A controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrators 12 uses controller device 10 (or multiple such management devices) to manage the network devices using a device management protocol. One example device protocol is the simple network management protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Elements 14 may be arranged into sites 13A-13C (collectively, "sites 13"). For example, elements 14A and 14B may be arranged at site 13A. Elements 14C-14E may be arranged at site 13B. In some examples, elements 14F and 14G may be arranged at site 13C. While the example of FIG. 1 shows only three sites (e.g., sites 13A-13C) other examples may include two sites, or more than three sites. In some examples, a site may have only one element or may include more than four elements.

Controller device 10, also referred to as a network management system (NMS) or NMS device, and elements 14 may be centrally maintained by an IT group of the enterprise. Administrators 12 may interact with controller device 10 to remotely monitor and configure elements 14. For example, administrators 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrators 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrators 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrators 12 may use controller device 10 to configure elements 14 to specify certain operational characteristics that further the objectives of administrators 12. For example, administrators 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the network configuration protocol (NETCONF) protocol or a derivative thereof, such as the Juniper Device Management Interface, to perform the configuration. In general, NETCONF provides mechanisms for configuring network devices and uses an extensible markup language (XML)-based data encoding for configuration data, which may include policy data. NETCONF is described in Enns, "NETCONF Configuration Protocol," Network Working Group, RFC 4741, December 2006, available at tools.ietf.org/html/rfc4741. Controller device 10 may establish NETCONF sessions with one or more of elements 14.

Controller device 10 may be configured to compare a new intent data model to an existing (or old) intent data model, determine differences between the new and existing intent data models, and apply the reactive mappers to the differences between the new and old intent data models. In particular, controller device 10 may determine whether the new set of configuration data includes any additional configuration parameters relative to the old intent data model, as well as whether the new set of configuration data modifies or omits any configuration parameters that were included in the old intent data model.

The intent data model may be a unified graph model (also referred to herein as simply "graph model"), while the low-level configuration data may conform to a command language supported by each of elements 14. For instance, low-level configuration data for element 14A may be in a first vender-specific language supported by element 14A, low-level configuration data for element 14B may be in a second vender-specific language supported by element 14B and not supported by element 14A, and so on. In some examples, the intent data model may be expressed in YAML Ain't Markup Language (YAML) or YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020. Controller device 10 may include various reactive mappers for translating the intent data model differences. These functions are configured accept the intent data model (which may be expressed as structured input parameters, e.g., according to YANG or YAML). The functions are also configured to output respective sets of low-level device configuration data changes, e.g., device configuration additions and removals. That is, $y1=f1(x)$, $y2=f2(x)$, . . . $yN=fN(x)$.

Controller device 10 may use YANG modeling for intent data model. This data may include relations across YANG entities, such as list items and containers. In some examples, controller devices may do not support configuration management functions in real time. As discussed in greater detail below, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the unified intent data model. Controller device 10 may be configured to use the same compilation logic for each of create, update, and delete as applied to the graph model. Controller device 10 may use a hierarchical data model for intents, low-level data models, and/or resources. Controller device 10 may use the hierarchical data model on YANG, YAML, or another model. Controller device 10 may represent the hierarchical data model as a graph, as discussed above. Some systems may support intents to ease the management of networks. Intents may be declarative. To realize intents, controller device 10 may attempt to select optimal resources.

Techniques described herein may help customers facing scale and performance issues, by, for example, prioritizing and ordering sites with network devices for applying configuration changes. For example, controller device 10 may be configured to determine, for each respective site of plurality of sites 13, a priority index based on a site-level usage of the software application at the respective site. Controller device 10 may continuously learn and correlate data analyzed from the network. As such, controller device 10 may be configured to dynamically prioritize sites in an order at which the deployment has to be done based on a change in a traffic trend. For example, controller device 10 may be configured to dynamically prioritize sites in an order at which the deployment has to be done based on region specific applications and/or threats. In some examples, controller device 10 may be configured to dynamically prioritize sites in an order at which the deployment has to be done based on a time-zone specific maintenance window for applying critical patches and/or policies.

Controller device 10 may be configured to manage elements 14 arranged at sites 13. For example, controller device 10 may be used by administrators 12 to configure elements 14 to specify certain operational characteristics that further the objectives of administrators 12. Controller device 10 may determine a stateful intent for managing a software application at elements 14 and represented by a graph model. For example, controller device 10 may determine whether a new set of configuration data for a software application includes any additional configuration parameters relative to the old intent data model, as well as whether the new set of configuration data modifies or omits any configuration parameters that were included in the old intent data model. Controller device 10 may translate the stateful intent into low-level configuration data for configuring elements 14. For example, controller device 10 may convert the stateful intent into low-level configuration data expressed in YANG.

Controller device 10 may determine, for each respective site of sites 13, a priority index based on a site-level usage of a software application at the respective site. For example, controller device 10 may determine a first priority index for site 13A based on network logs (e.g., syslogs) and/or application logs (e.g., AppTrack logs) for site 13A. In this example, controller device 10 may determine a second priority index for site 13B based on network logs (e.g., syslogs) and/or application logs (e.g., AppTrack logs) for the for site 13B. Controller device 10 may determine a third priority index for site 13C based on network logs (e.g., syslogs) and/or application logs (e.g., AppTrack logs) for the for site 13C.

Controller device 10 may determine an ordered list of sites 14 based on the priority index for each respective site of the plurality of sites. For example, controller device may determine the ordered list of sites as {site 14B, site 14C, and site 14A} in response to determining that site 14B has a higher priority index than sites 14A and 14C and in response to determining that site 14C has a higher priority index that site 14A.

Controller device 10 may configure, for each respective site of sites 13, and in an order specified by the ordered list of sites 13, one or more elements of elements 14 that are arranged at the respective site with the low-level configuration data. For example, controller device 10 may configure elements 14C-14E arranged at site 13B with the low-level configuration data. In this example, after configuring elements 14C-14E arranged at site 13B with the low-level configuration data, controller device 10 may configure elements 14F and 14G arranged at site 13C with the low-level configuration data. After configuring elements 14F and 14G arranged at site 13C according to the low-level configuration data, controller device 10 may configure elements 14A and 14B arranged at site 13A according to the low-level configuration data.

In this way, techniques described herein may dynamically prioritize sites 13. For example, controller device 10 may be configured to dynamically prioritize sites 13 in an order at which the deployment has to be done based on region specific applications and/or threats. In some examples, controller device 10 may be configured to dynamically prioritize sites in an order at which the deployment has to be done based on a time-zone specific maintenance window for applying critical patches and/or policies. While this example is for applying low-level configuration data, in some examples, controller device 10 may be configured to apply similar techniques for other functionalities, such as, but not limited to, a disk image upgrade on a network device or another functionality.

For example, configuring controller device 10 to determine, for each respective site of sites 13, a priority index based on a site-level usage of a software application at the respective site, may help to improve a performance of enterprise network 2 as discussed further below. Using site-level usage of a software application to determine a priority index may help to account for regional changes in usage of software application, which may help to improve an accuracy of the priority index. Improving an accuracy of the priority index may help to improve a performance of enterprise network 2 as discussed further below. In this example, controller device 10 may determine an ordered list of sites 13 based on the priority index for each respective site of the plurality of sites. Controller device 10 may configure, for each respective site of sites 13, and in an order specified by the ordered list of sites 13, one or more elements of elements 14 that are arranged at the respective site according to the low-level configuration data. For example, controller device 10 may configure elements 14C-14E of site 13A with low-level configuration data for a software application when only elements 14C-14E are using the software application. In this example, after applying the configuration data to elements 14C-14E, controller device 10 may configure elements 14F, 14G of site 13C with low-level configuration data for a software application when only elements 14C-14G are using the software application. After applying the configuration data to elements 14C-14G, controller device 10 may configure elements 14A, 14B of site 13A with low-level configuration data for a software application. In this way, a performance of enterprise network 2 may be improved to effectively apply configuration data to elements 14 faster than networks that do not determine a priority index based on a site-level usage.

Figure 2:
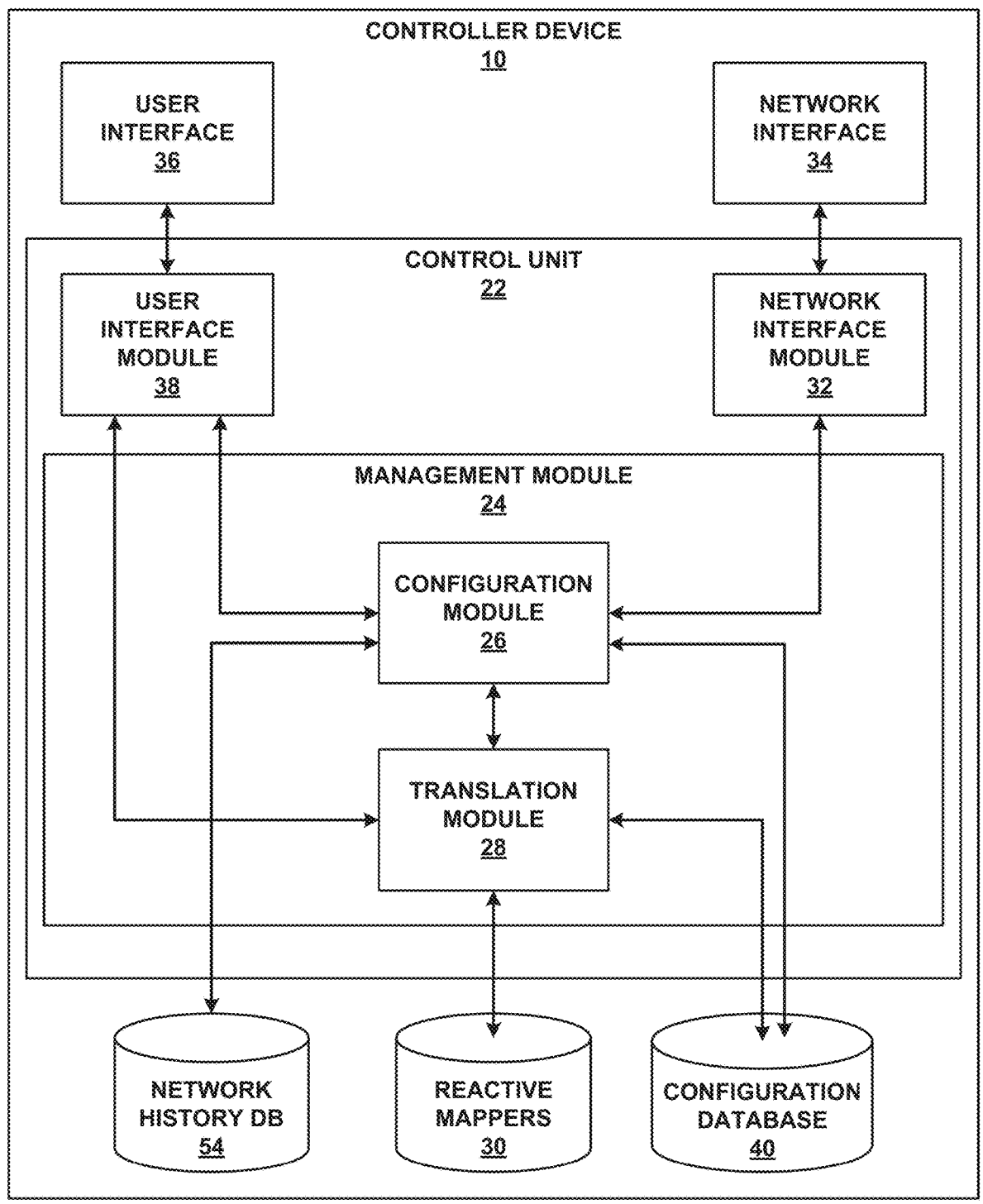
FIG. 2 is a block diagram illustrating an example set of components for the management device of FIG. 1.

FIG. 2 is a block diagram illustrating an example set of components for controller device 10 of FIG. 1. In this example, controller device 10 includes a control unit 22, a network interface 34, and a user interface 36. Network interface 34 may represent an example interface that can communicatively couple network device 20 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (e.g., 802.11 a/b/g/n, etc.). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 may include hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrators 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, administrators 12 need not directly interact with controller device 10, but instead may access controller device 10 remotely, e.g., via network interface 34.

Control unit 22 may include a user interface module 38, a network interface module 32, and a management module 24. Control unit 22 may execute user interface module 38 to receive input from and/or provide output to user interface 36. Control unit 22 may execute network interface module 32 to send and receive data (e.g., network packets) via network interface 34. User interface module 38, network interface module 32, and management module 24 may be implemented as respective hardware units, in software, in firmware, or a combination hardware units, software, firmware.

Functionality of control unit 22 may be implemented as one or more processing units in fixed or programmable digital logic circuitry. Such digital logic circuitry may include, for example, one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 22 may further include one or more computer readable storage media storing hardware or firmware instructions to be executed by processing unit(s) of control unit 22.

Control unit 22 may execute management module 24 to manage various network devices, e.g., elements 14 of FIG. 1. Management includes, for example, configuring the network devices according to instructions received from a user (e.g., administrators 12 of FIG. 1) and providing the user with the ability to submit instructions to configure the network devices. In this example, management module 24 further includes configuration module 26 and translation module 28.

Management module 24 is configured to receive intent unified-graph-modeled configuration data for a set of managed network devices from a user, such as administrators 12. The intent unified-graph-modeled configuration data may be referred to as an "intent data model." Over time, a user (e.g., administrators 12 shown in FIG. 1) may update the configuration data, e.g., to add new services, remove existing services, or modify existing services performed by the managed devices. The unified intent data model may be structured according to, e.g., YANG or YAML. The graph model may include a plurality of vertices connected by edges in a hierarchical fashion. In YANG, edges of graph models are represented though "leafref" elements. In the case of YAML, such edges may be represented with a "ref" edge. Similarly, parent to child vertex relations can be represented with a "has" edge. For example, a vertex for Element A refers to a vertex for Element B using a has-edge can be understood to mean, "Element A has Element B." In some examples, management module 24 also provides the user with the ability to submit reactive mappers that translation module 28 executes to transform the intent data model to device-specific, low-level configuration instructions.

Controller device 10 may include configuration database 40. Configuration database 40 may include information describing managed network devices, e.g., elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 may store current configuration information (e.g., intent data model, or in some cases, both intent data model and low-level configuration information) for the managed devices (e.g., elements 14). Configuration database 40 may include a unified intent data model.

Translation module 28 may determine which of reactive mappers 30 to execute on the intent data model based on the information of configuration database 40, e.g., which of the devices are to receive the low-level configuration instructions. Translation module 28 may execute each of the determined reactive mappers of reactive mappers 30, providing the intent data model (e.g., YANG model) to the reactive mappers as input and receiving low-level configuration instructions (e.g., that conform to a command language supported by each of elements 14). Translation module 28 may also be referred to as an intent translator, which is a service containing a set of mappers, such as reactive mappers 30.

Configuration module 26 may determine an existing intent data model for each service performed by the devices for which configuration is to be updated, e.g., by retrieving the intent data model for each of the services from configuration database 40. Configuration module 26 may compare the existing intent data model (also referred to herein as a "deployed graph model") to the newly received intent data model, and determine differences between the existing and newly received intent data models (also referred to as an "undeployed graph model"). Configuration module 26 may add these changes to the translator stream, and reactive mappers 30 may translate these changes to low-level configuration information. The changes may be included in a change set, which may be a list containing intent graph vertices and corresponding version identifiers. Management module 24 may use the change set to track the list of vertices changed in an intent update. After the intent has been committed, management module 24 may use the change set to update vertex states in the intent graph model. Configuration module 26 may update the existing intent data model recorded in configuration database 40 based on the newly received intent data model.

Reactive mappers 30 that perform update translations (that is, translating changes in the unified intent data model that results in updates to values of low-level configuration information, without creation or deletion of elements in the low-level configuration data) may operate as follows. In one example, the reactive mappers 30 that perform updates may override single elements. For example, performance of these reactive mappers may result in deletion of an element value, e.g., by replacing an old element value with a new value. Sometimes, a single value in a configuration service model can be mapped to a list in a device configuration. In these cases, translation module 28 may send the old value as well as the new value.

Translation module 28 (which may be configured according to reactive mappers 30) may use the same reactive mapper for creation, updates, and deletion of intent data model vertices. Because each vertex has its own corresponding reactive mapper, compilation can be performed in parallel. For example, the reactive mappers of each of the vertices of the graph model representing the unified intent data model can be executed in parallel, thereby achieving parallel compilation. Translation module 28 may be configured to allow processing of only impacted intent data model data changes (i.e., those elements in the intent data model that are impacted by the changes). Based on reactive mappers 30, translation module 28 may infer dependencies across vertices in the intent data model. When the intent data model is changed, translation module 28 may publish messages in the translator stream based on a dependency graph, as discussed above.

When a "create" template is uploaded (that is, a reactive mapper of reactive mappers 30 that processes new data in intent data model configuration information, relative to existing intent data model configuration information), translation module 28 may determine the dependencies using the dependency graph. When the service is changed, translation module 28 may generate a difference between the existing intent data model configuration information and the new intent data model configuration information, based on the dependencies. Translation module 28 may then use the reactive mapper of reactive mappers 30 to process the difference, and thereby translate the intent data model configuration information to low-level configuration instructions. Translation module 28 may then provide the low-level configuration instructions to configuration module 28.

Although user interface 36 is described for purposes of example as allowing administrators 12 (FIG. 1) to interact with controller device 10, other interfaces may be used in other examples. For example, controller device 10 may include a representational state transfer (REST) client (not shown) that may act as an interface to another device, by which administrators 12 may configure controller device 10. Likewise, administrators 12 may configure elements 14 by interacting with controller device 10 through the REST client.

Management module 24 may model configuration database 40 as a graph database representing YANG configuration data elements. YANG specifies various types of data structures, including lists, leaflists, containers, containers with presence, and features. Management module 24 may model each of lists, containers, containers with presence, and features, as well as a top-level container, as vertices in a graph database. Alternatively, configuration database 40 may represent YAML configuration data elements.

After constructing a graph database, management module 24 may perform operations on data of the graph database. For example, management module 24 may map Netconf-based operations, such as get-config, get-config with filters, and edit-config, to graph query language queries, such as Gremlin queries. Gremlin is described in GremlinDocs at gremlindocs.spmallette.documentup.com and in github.com/tinkerpop/gremlin/wiki. Management module 24 may execute conditions mapped to vertices and edges of the graph database if the condition attributes are changed. In response to the conditions, management module 24 may process additional changes, handled as functions as discussed in greater detail below. Management module 24 may update all changes in transaction semantics.

After receiving the low-level configuration instructions from translation module 28, configuration module 28 may access network history database 54. Network history database 54 may include one or more application logs (e.g., AppTrack logs) and/or one or more network logs (e.g., syslogs) for each site of sites 13). Each application log for a particular application and for a particular site may include a respective amount of data transmitted to the site and for use by a software application for each event. For example, a first application log for a video-sharing application for site 13A may indicate a particular amount of data transmitted to the site and for use by the video-sharing application for each event. In this example, a second application log for a video streaming application for site 13A may indicate a particular amount of data transmitted to the site and for use by the video streaming application for each event.

Each network log may for a particular application and for a particular site may include a time that an amount of data was transmitted to the site and for use by the software application. For example, the network log may include time stamps for each event of a corresponding application log. For instance, an application log for a video-sharing application for site 13A may indicate a particular amount of data transmitted to the site and for use by the video-sharing application for a first event. In this example, a network log for site 13A may indicate a particular time for the first event in the application log. In some examples, configuration module 26 may generate plots representing site-level usage of a software application (see FIG. 7) that represents a particular amount of data transmitted to a particular site and for use by a particular software application for each event over a time period (e.g., a day).

Control unit 22 may be configured to manage elements 14 arranged at sites 13 (shown in FIG. 1). Management module 24 may determine a stateful intent for managing a software application at elements 14 and represented by a graph model. For example, management module 24 may receive a stateful intent from administrators 12. Translation module 28 may translate the stateful intent into low-level configuration data for configuring elements 14. For example, translation module 28 may translate the stateful intent into low-level configuration data.

Configuration module 26 may determine, for each respective site of sites 13, a priority index based on a site-level usage of a software application at the respective site. For example, configuration module 26 may determine a priority index for each of sites 13 based on network logs (e.g., syslogs) and/or application logs (e.g., AppTrack logs) stored at network history database 54.

Configuration module 26 may determine an ordered list of sites 14 based on the priority index for each respective site of the plurality of sites. For example, configuration module 26 may determine the ordered list of sites as {site 14B, site 14C, and site 14A} in response to determining that site 14B has a higher priority index than sites 14A and 14C and in response to determining that site 14C has a higher priority index that site 14A.

Configuration module 26 may configure, for each respective site of sites 13 and in an order specified by the ordered list of sites 13, one or more elements of elements 14 that are arranged at the respective site according to the low-level configuration data. For example, controller device 10 may configure elements 14C-14E arranged at site 13B according to the low-level configuration data. In this example, after configuring elements 14C-14E arranged at site 13B according to the low-level configuration data, controller device 10 may configure elements 14F and 14G arranged at site 13C according to the low-level configuration data. After configuring elements 14F and 14G arranged at site 13C according to the low-level configuration data, controller device 10 may configure elements 14A and 14B arranged at site 13A according to the low-level configuration data.

Figure 3:
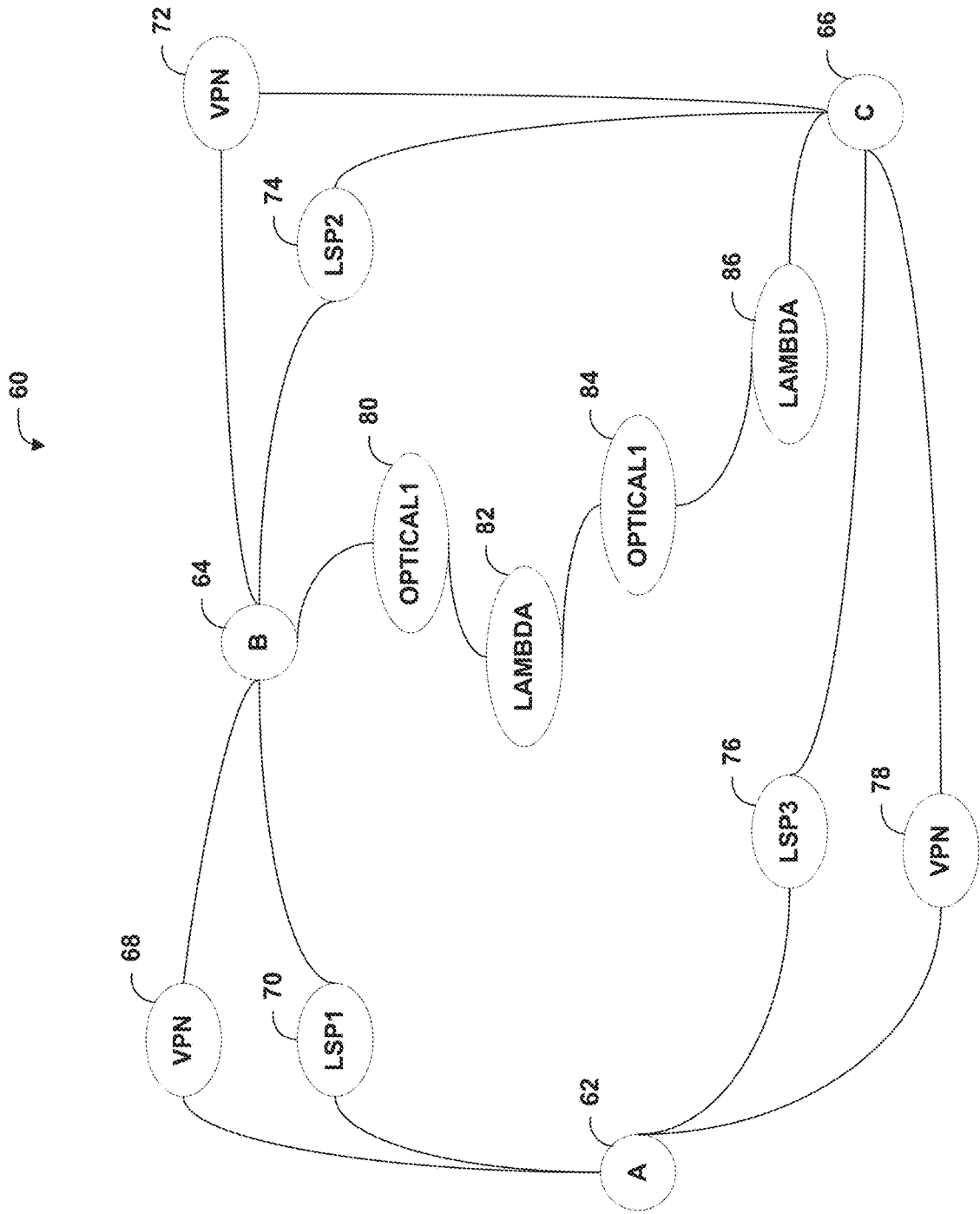
FIG. 3 is a conceptual diagram illustrating an example unified graph model for an intent data model.

FIG. 3 is a conceptual diagram illustrating an example unified graph model 60 for an intent data model. Unified graph model 60, in this example, includes nodes A 62, B 64, and C 66, among others. Initially, unified graph model may not include VPN 68, VPN 72, and VPN 78, nor optical1 80, lambda 82, optical1 84, and lambda 86. As a result of modifications through intent data model updates, node A 62 is coupled to node B 64 via VPN 68 and LSP1 70, node B 64 is coupled to node C 66 via VPN 72 and LSP2 74, and node C 66 is coupled to node A 62 via VPN 78 and LPS3 76. Furthermore, as a result of additional capacity being required as an optical intent, additional nodes optical1 80, lambda 82, optical1 84, and lambda 86 are added between node B 64 and node C 66.

Stateful business policies can be written on top of a stateless intent layer. For example, a user may state the intent "provide high bandwidth VPN connectivity between sites A, B, and C with bandwidth between A-B, B-C, C-A, . . . ." This may lead to various stateless intents. The stateful intent may be translated into a L3VPN (overlay tunnel) and a transport mechanism between A-B, B-C, C-A that provides the bandwidth required. For example, the transport mechanism may include an RSVP LSP between A-B with 30 Mbps, an RSVP LSP between B-C with 50 Mbps, and an RSVP LSP between C-A with 80 Mbps. In this instance, the RSVP-LSP between C-A with 80 Mbps may need to be created. There could be a situation where more capacity is required, so there may yet be a further intent "optical intent: increase capacity between C-A." If there is already a 70 Mbps connection for C-A, the stateless intent may provision a new 10G lambda between C-A on an optical network.

When realizing stateful intents, a controller device, such as controller device 10, may need to account for existing stateless intents across endpoints, as well as the current state. In the above example, to perform the various intents, controller device 10 may query a connected graph (including stateless intents) and create/modify the stateless intents, as necessary. Techniques related to using unified graph models and intents are described in U.S. applicant Ser. No. 15/462,465, filed Mar. 17, 2017, which is incorporated by reference in its entirety. Thus, intent data models can be represented using unified graph models. When more use cases are added, the intent data model (i.e., the unified graph model) can be extended. Also, use of unified graph models allows for retrieval of intents based on endpoints (e.g., by querying the graph).

Figure 4:
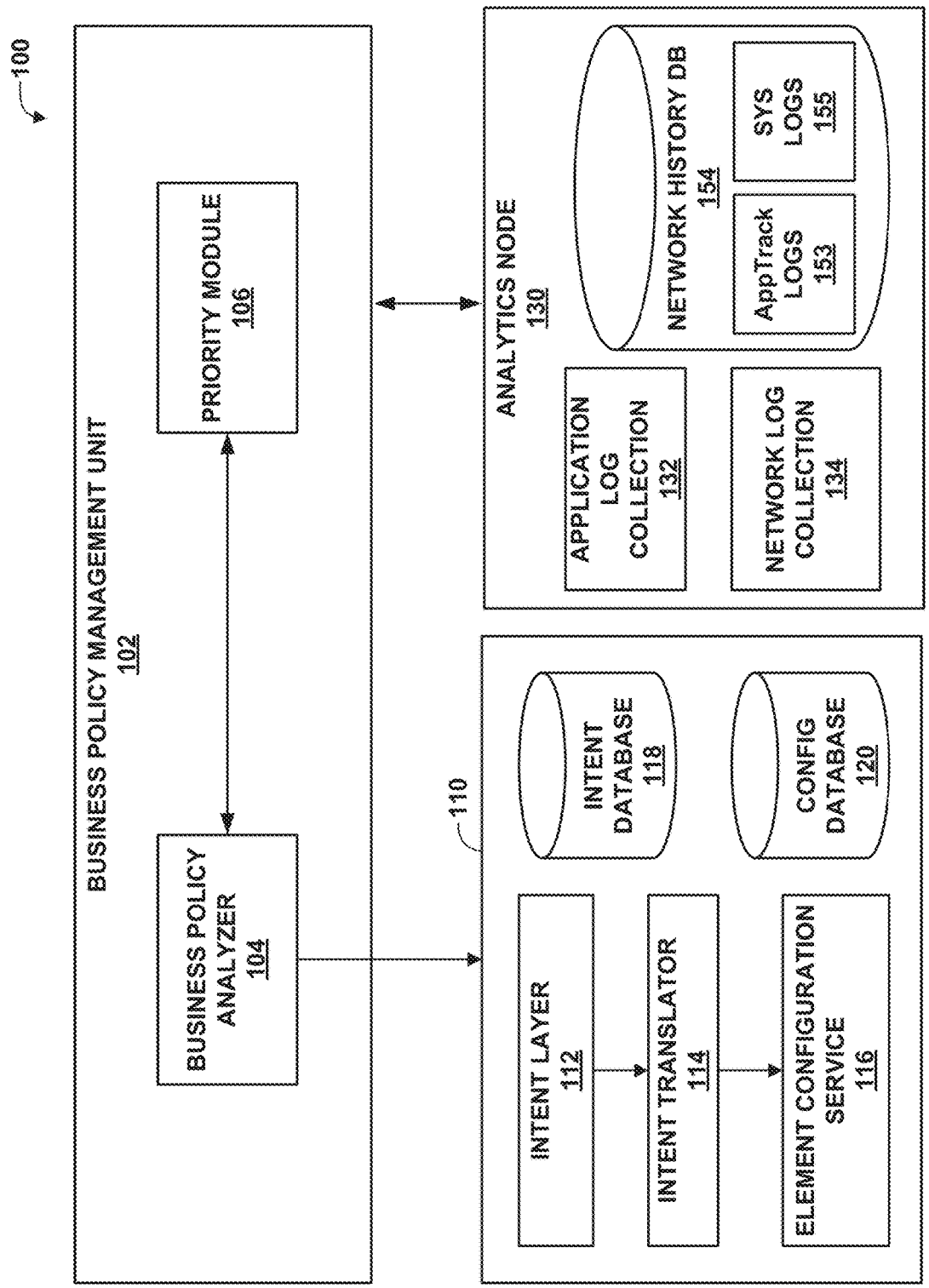
FIG. 4 is a conceptual diagram illustrating an example model of components of a controller device, such as the controller device of FIGS. 1 and 2, according to techniques of this disclosure.

FIG. 4 is a conceptual diagram illustrating an example model 100 of components of a controller device, such as controller device 10, according to techniques of this disclosure. In this example, model 100 includes a business policy management unit 102, an intent infrastructure 110, and an analytics node 130. Business policy management unit 102 includes a business policy analyzer 104 and a priority module 106. Intent infrastructure 110 includes an intent layer 112, an intent translator 114, an element configuration service 116, an intent database 118, and a configuration (config) database 120. Analytics node 130 includes an application log collection 132, a network log collection 134, and a network history database 154. Network history database 154 may include, for each site of sites 13, one or more application logs ("AppTrack LOGS 153") and one or more system logs 155 ("SYS LOGS 155").

Management module 24 of FIG. 2 may include components that perform the functionality attributed to various components of model 100. For example, configuration module 26 of FIG. 2 may correspond to intent infrastructure 110, translation module 28 may correspond to intent translator 114, configuration database 120 may correspond to configuration database 40 and so on. Certain components shown in FIG. 4 may be implemented by management module 24 of FIG. 2.

In general, business policy analyzer 104 manages stateful intents. Business policy analyzer 104 communicates with assurance module 106 to obtain resources for the stateful intents. Business policy analyzer 104 also calls intent layer 112 to provision stateless intents. The techniques of this disclosure may be used to ensure business policies are translated to the network in near real time to prevent negative impacts to a service-level agreement (SLA). Intent translator 114 may be configured to translate intents concurrently. Additional details regarding parallel, concurrent compilation of intents are described in "SUPPORTING COMPILATION AND EXTENSIBILITY ON UNIFIED GRAPH BASED INTENT MODELS," U.S. application Ser. No. 16/282,160, filed Feb. 21, 2019, the entire contents of which are hereby incorporated by reference.

During an operation of enterprise network 2, application log collection 132 may periodically determine, for each of sites 13 and for each software application, an amount of data transmitted to a site and for use by a software application. For example, application log collection 132 may determine a first amount of data transmitted to site 13A for a video-sharing application and store, at one or more application logs 153, an indication of the first amount of data in an application log for site 13A and for the video-sharing application. Each instance that application log collection 132 determines the amount of data transmitted may be an event.

During an operation of enterprise network 2, network log collection 134 may periodically determine, for each of sites 13 and for each software application, a time for each event in one or more application logs 153. For example, network log collection 134 may determine a first time for a first amount of data transmitted to site 13A for a video-sharing application and store, in one or more network logs 155, an indication of the first time in a network log for site 13A and for the video-sharing application.

After generating one or more application logs 153 and one or more network logs 155, priority module 106 may determine, for each event at a site of sites 13, a respective amount of data transmitted to the site and for use by the software application using one or more application logs 153. For example, priority module 106 may determine a first amount of data for a first event is 2 GB, a second amount of data for a second event is 1.5 GB, and so on.

Priority module 106 may determine, using one or more network logs 155, for each event, a respective time the respective amount of data was transmitted to the site and for use by the software application. For example, priority module 106 may determine a first time of 1:00 for the first event corresponding to the first amount of data of 2 GB, a second time of 2:00 for the second event corresponding to the second amount of data of 1.5 GB, and so on.

Priority module 106 may generate a plot representing, for each event over a time period (e.g., a day), site-level usage of a software application (see FIG. 7) that represents a particular amount of data transmitted to a particular site and for use by a particular software application. In some examples, priority module 106 may determine, for a site of sites 13, a best fit line that represents, for each event of a plurality of events of the site-level usage, a respective amount of data transmitted to the site and for use by the software application and a respective time the respective amount of data was transmitted to the site and for use by the software application. For example, priority module 106 may apply linear regression, non-linear regression, and/or machine learning to the plot representing site-level usage of a software application.

Priority module 106 may be configured to determine a priority index for each of sites 13 using the best fit line. For example, priority module 106 may assign each site to a group based on the best fit line. For instance, priority module 106 may assign each site with best fit line that includes a positive slope to a first group, each site with best fit line that includes a constant slope to a second group, each site with best fit line that includes a negative slope to a third group.

In some examples, priority module 106 may assign each site assigned to the first group with a higher priority index than sites assigned to the second group and the third group.

In some examples, priority module 106 may determine a priority index for each site with a group of sites. For example, priority module 106 may determine a maximum amount of data transmitted to site 13A and for use by a software application using the best fit line. In this example, priority module 106 may determine the priority index based on the maximum amount of data transmitted to site 13A and for use by a software application. For instance, priority module 106 may determine site 13A of a group of sites that includes sites 13A and 13B has best fit line with a first maximum amount of data transmitted that is higher than a second maximum amount of data transmitted to site 13B. In this example, priority module 106 may assign site 13A with a highest priority index (e.g., '1') for the group and site 13B with a second highest priority index (e.g., '2') for the group in response to determining the site 13A has the first maximum amount of data transmitted that is higher than the second maximum amount of data transmitted to site 13B.

Business policy analyzer 104 may be configured to manage elements 14 arranged at sites 13. Business policy analyzer 104 may determine a stateful intent for managing a software application at elements 14 and represented by a graph model. For example, business policy analyzer 104 may receive a stateful intent from administrators 12. Intent infrastructure 110 may translate the stateful intent into low-level configuration data for configuring elements 14. For example, intent translator 114 may convert the stateful intent into low-level configuration data expressed in YANG.

In accordance with the techniques of the disclosure, priority module 106 may determine, for each respective site of sites 13, a priority index based on a site-level usage of a software application at the respective site. For example, priority module 106 may determine a priority index for each of sites 13 based on one or more application logs 153 and one or more network logs 155. For example, priority module 106 may be configured to determine a priority index for each of sites 13 using a slope and maximum amount of data transmitted of a best fit line for each of sites 13.

Priority module 106 may determine an ordered list of sites 14 based on the priority index for each respective site of the plurality of sites. For example, priority module 106 may determine the ordered list of sites as {site 14B, site 14C, and site 14A} in response to determining that site 14B has a higher priority index than sites 14A and 14C and in response to determining that site 14C has a higher priority index that site 14A.

Intent infrastructure 110 may configure, for each respective site of sites 13 and in an order specified by the ordered list of sites 13, one or more elements of elements 14 that are arranged at the respective site according to the low-level configuration data. For example, intent infrastructure 110 may configure elements 14C-14E arranged at site 13B according to the low-level configuration data. In this example, after configuring elements 14C-14E arranged at site 13B according to the low-level configuration data, intent infrastructure 110 may configure elements 14F and 14G arranged at site 13C according to the low-level configuration data. After configuring elements 14F and 14G arranged at site 13C according to the low-level configuration data, intent infrastructure 110 may configure elements 14A and 14B arranged at site 13A according to the low-level configuration data. In this way, techniques described herein may dynamically prioritize sites 13.

Figure 5:
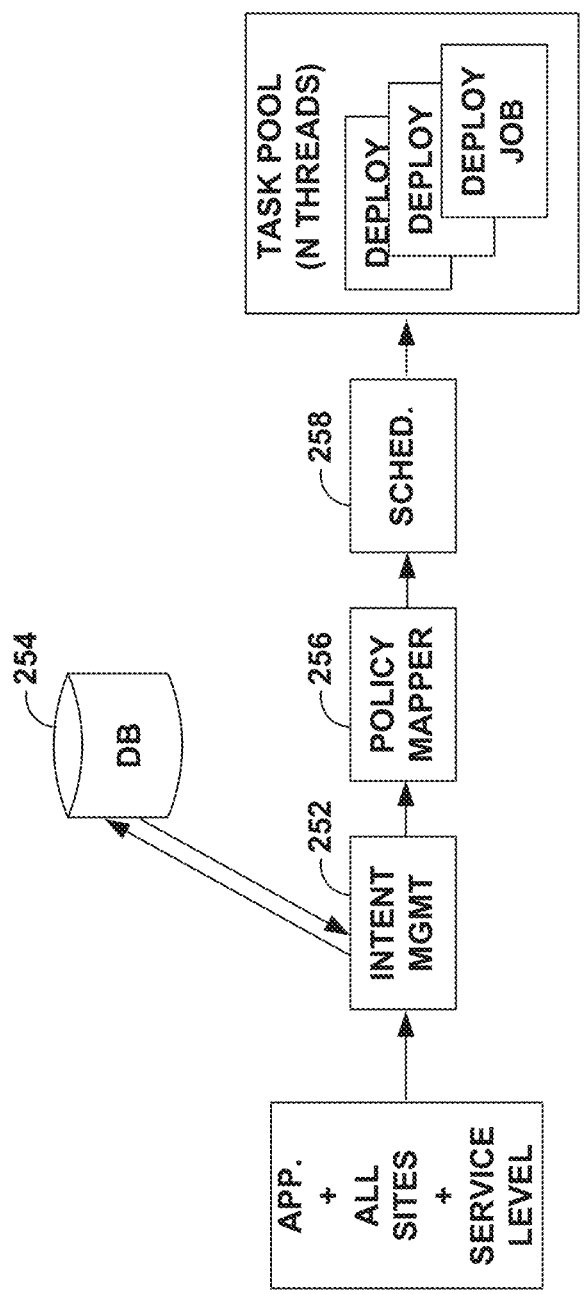
FIG. 5 is a conceptual diagram illustrating a first example workflow of components of a controller device, such as the controller device of FIGS. 1 and 2, according to techniques of this disclosure.

FIG. 5 is a conceptual diagram illustrating a first example workflow of components of a controller device, such as controller device 10 of FIGS. 1 and 2, according to techniques of this disclosure. An intent manager 252 may be part of intent infrastructure 110. In some examples, a policy mapper 256 and a scheduler 258 may be part of priority module 106.

Intent manager 252 may determine a stateful intent for managing a software application to be applied to all sites and a particular service level in response to a request to apply to a software application ("APP."), to all sites, with a particular services level (e.g., gold service-level agreement). In this example, intent manager 252 may translate stateful intent for all sites into low-level configuration data using database 254. Database 254 may include an intent database (e.g., intent database 118 of FIG. 4) and/or a configuration database (e.g., configuration database 120 of FIG. 4). Policy mapper 256 may breakdown applying the low-level configuration data into site specific jobs and device specific configurations. Scheduler 258 may schedule the site specific jobs and device specific configurations into a task pool.

Figure 6:
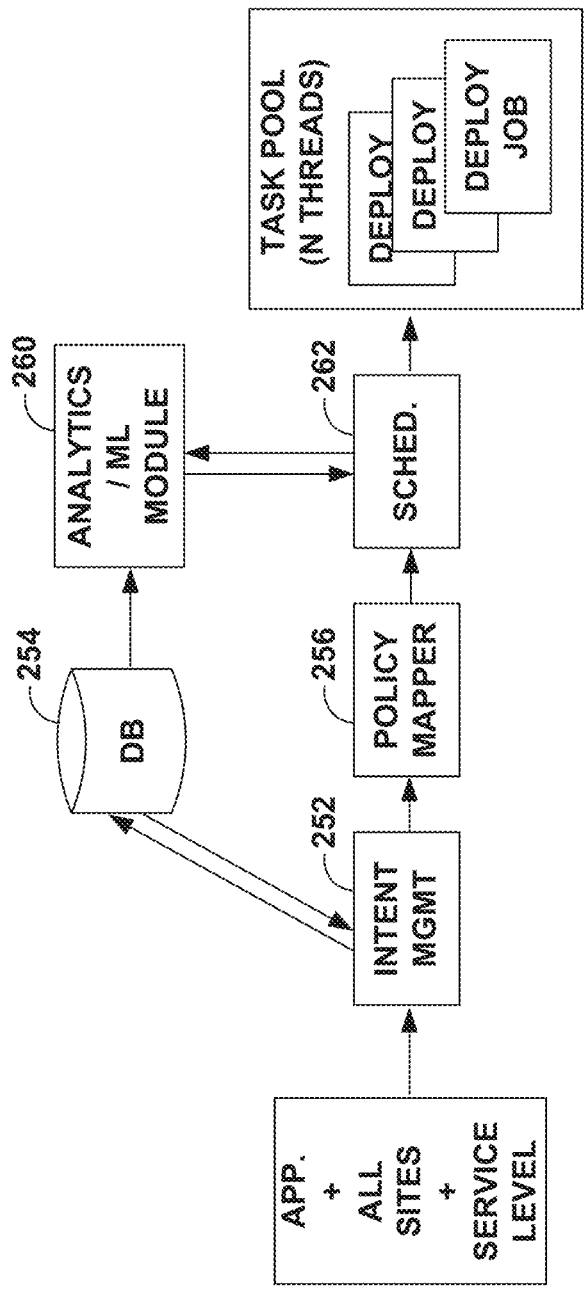
FIG. 6 is a conceptual diagram illustrating a second example workflow of components of a controller device, such as the controller device of FIGS. 1 and 2, according to techniques of this disclosure.

FIG. 6 is a conceptual diagram illustrating a second example workflow of components of a controller device, such as controller device 10 of FIGS. 1 and 2, according to techniques of this disclosure. Intent manager 252 may be part of intent infrastructure 110. In some examples, policy mapper 256, scheduler 258, and analytics module and/or machine learning module 260 ("ANALYTICS/ML MODULE 260") may be part of priority module 106.

Similar to FIG. 5, intent manager 252 may determine a stateful intent for managing a software application to be applied to all sites and a particular service level in response to a request to apply to a software application ("APP."), to all sites, with a particular services level (e.g., gold service-level agreement (SLA)). In this example, intent manager 252 may translate stateful intent for all sites into low-level configuration data using database 254. Database 254 may include an intent database (e.g., intent database 118 of FIG. 4) and/or a configuration database (e.g., configuration database 120 of FIG. 4). Policy mapper 256 may breakdown applying the low-level configuration data into site specific jobs and device specific configurations.

In accordance with the techniques of the disclosure, scheduler 262 may schedule the site specific jobs and device specific configurations with analytics module and/or machine learning module 260. For example, analytics module and/or machine learning module 260 may be configured to dynamically prioritize sites in an order at which the deployment has to be done based on a change in the traffic trend. In some cases, application traffic trend across different sites may vary depending on the department's associated with the sites or with the geographic locations of the site. For example, application traffic trend may vary when sites are operating and/or located in different geographical locations. For instance, during a morning time period of a first time zone there may be relatively high application traffic through sites located within the first time zone and negligible or no application traffic through sites located within a second time zone that is geographically remote from the first time zone. Similarly during evening hours of the first time zone there may be relatively large application traffic through sites located within the second time zone while very negligible or no application traffic through sites located within the first time zone. As such, if an administrator (e.g., administrators 12) has intended to deny particular application traffic across all the sites, a performance of controller device 10 may be improved by prioritizing deployment of the policy to sites expected to have relatively large application traffic over sites expected to have very negligible or no application traffic.

Analytics module and/or machine learning module 260 may generate a linear relationship for application usage. For example, analytics module and/or machine learning module 260 may find the model equation for the given scatter plot and apply the appropriate regression. Analytics module and/or machine learning module 260 may use a "correlation coefficient" process which may help in finding out significant relation among variables. The value of correlation coefficient ranges from −1 to 1 (−1 shows strong negative correlation and +1 shows strong positive correlation). The 0 correlation coefficient shows no correlation between variables. In the 0 correlation case, analytics module and/or machine learning module 260 may reject prioritizing sites and apply policy in batches. In examples where there is a non-zero correlation, the analytics module may proceed further to regress Y on X as follows.

$$Y = f\beta_i X + e \quad \text{Regression Equation}$$

Y—dependent variable
X—independent variable
β—model parameter
e—residue

If the parameters (β1, β2) are linear, the analytics module may apply linear regression. For example, analytics module and/or machine learning module 260 may perform the following calculation.

$$Y = \beta_1 X + \beta_2$$

If the equation includes non-linear parameters, the analytics module may use non-linear regression. For example, analytics module and/or machine learning module 260 may calculate the following.

$$Y = e^{\beta_1 X + \beta_2}$$

In the linear or non-linear techniques, priority module 106 may determine the value of β1 and β2 to reduce the squared error between the value of Y and the estimation of Ye.

$$LSE = [e]2 = [Y - Ye]2$$

The number of parameters (e., β1, β2, β3, etc.) and the regression equation may be changed.

Analytics module and/or machine learning module 260 may provide a site-level usage of the software application at each site. In some examples, analytics module and/or machine learning module 260 may apply linear regression, non-linear regression, and/or machine learning to generate a best fit line for each site. Analytics module and/or machine learning module 260 may determine a priority index for each of sites 13 using the best fit line. For example, analytics module and/or machine learning module 260 may assign each site to a group based on the best fit line best fit line for each site. For instance, analytics module and/or machine learning module 260 may assign each site with best fit line that includes a positive slope to a first group, each site with best fit line that includes a constant slope to a second group, each site with best fit line that includes a negative slope to a third group.

Analytics module and/or machine learning module 260 may determine the priority index for each site further based on a maximum amount of data transmitted indicated by a best fit line. Scheduler 262 may schedule the site specific jobs and device specific configurations into a task pool. In this way, techniques described herein may dynamically prioritize applying low-level configuration data to sites 13. For example, controller device 10 may be configured to dynamically prioritize sites 13 in an order at which the deployment has to be done based on region specific applications and/or threats. In some examples, controller device 10 may be configured to dynamically prioritize sites in an order at which the deployment has to be done based on a time-zone specific maintenance window for applying critical patches and/or policies. While this example is for applying low-level configuration data, in some examples, controller device 10 may be configured to apply similar techniques for other functionalities, such as, but not limited to, a disk image upgrade on a network device or another functionality.

Figure 7:
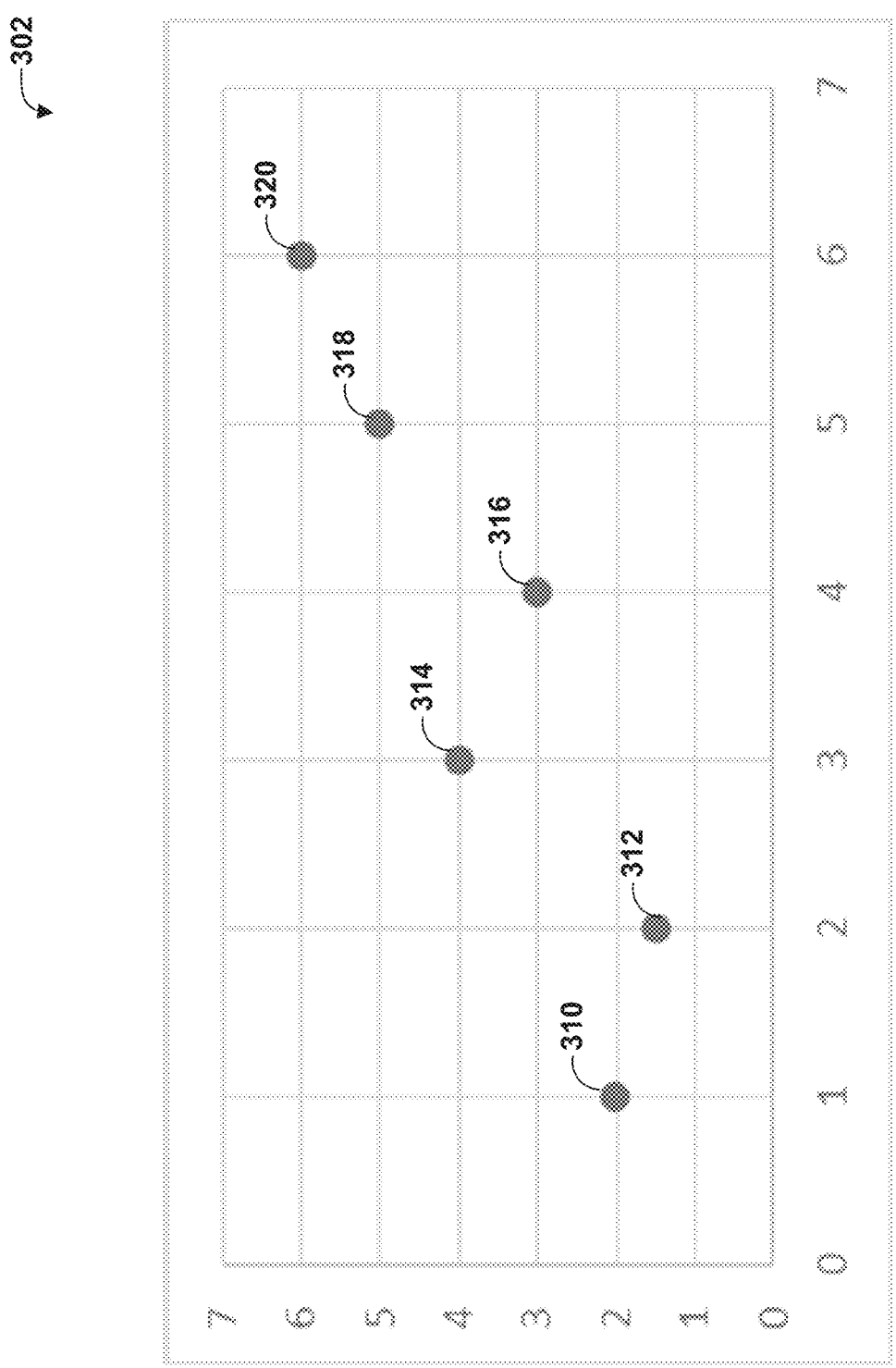
FIG. 7 is a conceptual diagram illustrating an example plot of historical data for a particular application, according to techniques of this disclosure.

FIG. 7 is a conceptual diagram illustrating an example plot of historical data 302 for a particular application, according to techniques of this disclosure. In the example of FIG. 7, controller device 10 may determine trends from historical time-series data. FIG. 7 illustrates a plot of historical data for a particular application (e.g., a video streaming application) on all the sites. The abscissa axis (e.g., x-axis) of FIG. 7 represents time and the ordinate axis (e.g., y-axis) of FIG. 7 represents application bytes as y-axis.

As shown, an event 310 corresponds to 2 units of usage (e.g., 2 MB, 2 GB, etc.) for the particular application at time 1 (e.g., 1:00 PM ET, 1:00 PM IST, etc.), an event 312 corresponds to 1.5 units of usage for the particular application at time 2 (e.g., 2:00 PM ET, 2:00 PM IST, etc.), an event 314 corresponds to 4 units of usage for the particular application at time 3 (e.g., 3:00 PM ET, 1:00 PM IST, etc.), an event 316 corresponds to 3 units of usage for the particular application at time 4 (e.g., 4:00 PM ET, 4:00 PM IST, etc.), an event 318 corresponds to 5 units of usage for the particular application at time 5 (e.g., 5:00 PM ET, 5:00 PM IST, etc.), and an event 320 corresponds to 6 units of usage for the particular application at time 6 (e.g., 6:00 PM ET, 6:00 PM IST, etc.).

Figure 8:
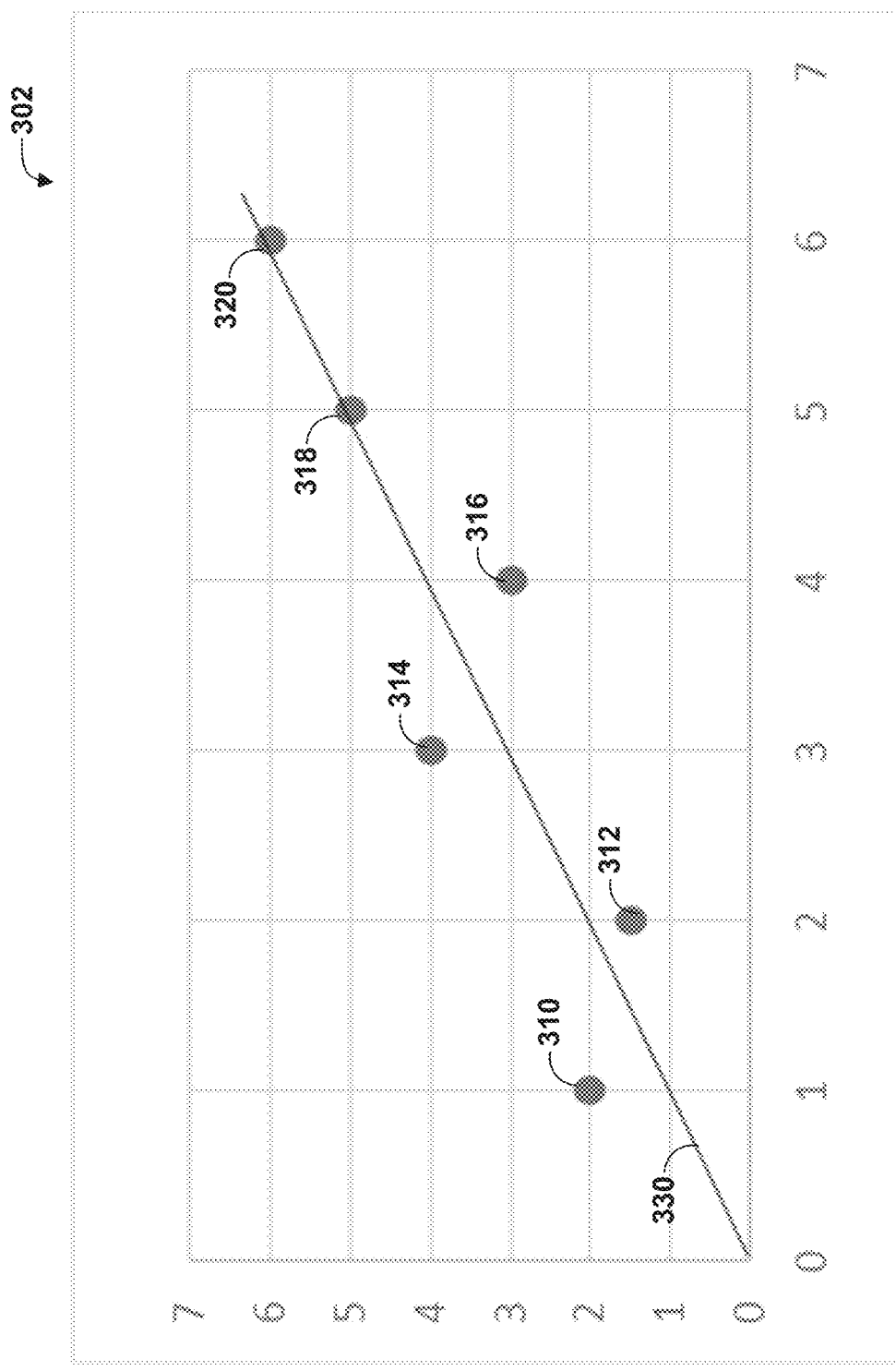
FIG. 8 is a conceptual diagram illustrating an example best fit line for the plot of historical data for a particular application of FIG. 8, according to techniques of this disclosure.

FIG. 8 is a conceptual diagram illustrating an example best fit line 330 for the plot of historical data 302 for a particular application of FIG. 8, according to techniques of this disclosure. The abscissa axis (e.g., x-axis) of FIG. 8 represents time and the ordinate axis (e.g., y-axis) of FIG. 8 represents application bytes as y-axis.

In the example of FIG. 8, controller device 10 may determine an equation of a best fit line 330 (e.g., one which has least squared error) for the plot of historical data 302. For example, controller device 10 may determine an equation of a best fit line using linear regression. In some examples, controller device 10 may determine an equation of a best fit line using non-linear regression. Controller device 10 may determine an equation of a best fit line using machine learning.

Figure 9:
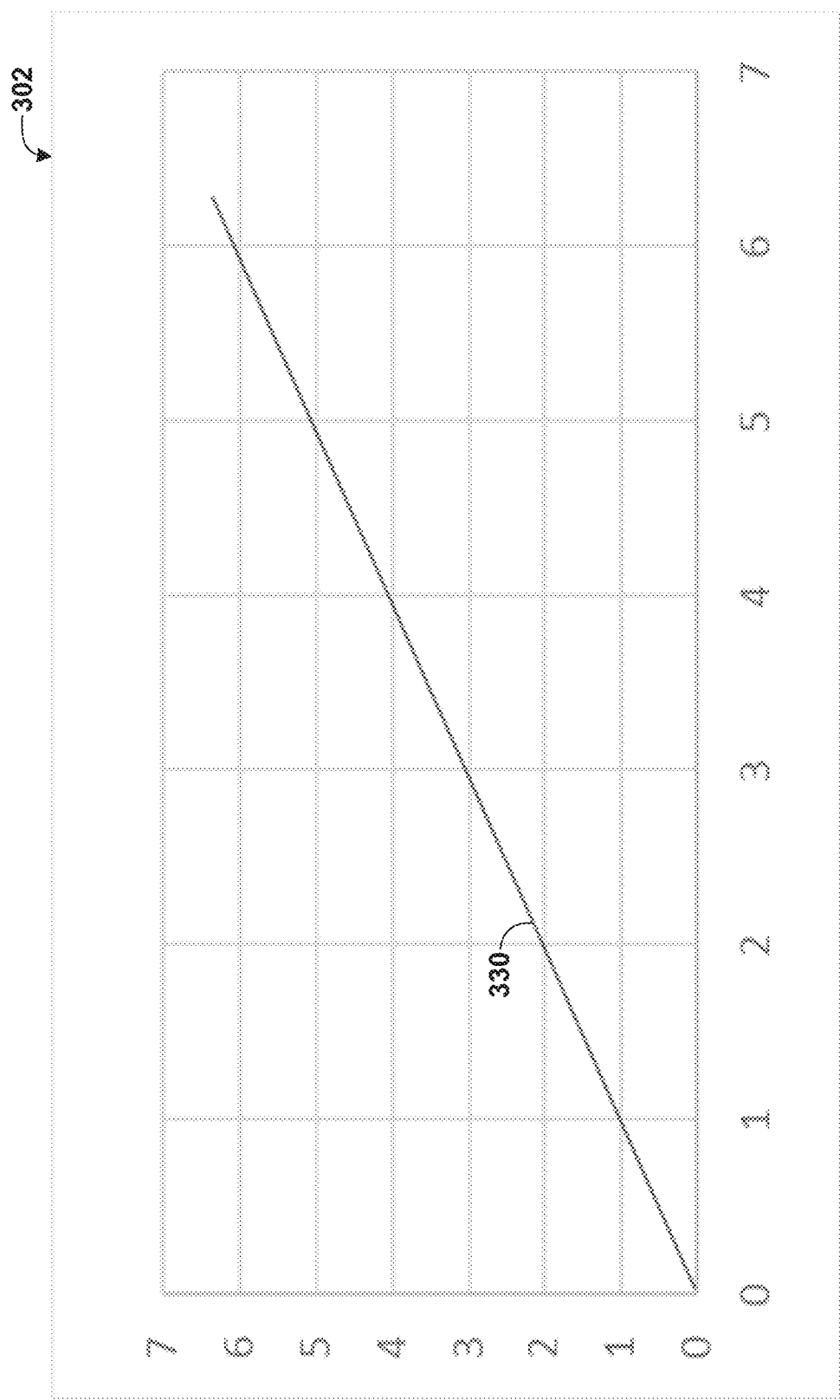
FIG. 9 is a conceptual diagram illustrating an example best fit line representing an increasing usage of a software application over time, according to techniques of this disclosure.

FIG. 9 is a conceptual diagram illustrating an example best fit line 330 representing an increasing usage of a software application over time, according to techniques of this disclosure. The abscissa axis (e.g., x-axis) of FIG. 9 represents time and the ordinate axis (e.g., y-axis) of FIG. 9 represents application bytes as y-axis.

In the example of FIG. 9, controller device 10 may determine a slope of best fit line 330. For example, controller device 10 may determine 'm' when the best fit line is determined using linear regression (e.g., y=mx+c), where 'm' is a linear slope. In this example, the slope has a value of 1 (e.g., m=1) with an offset of 0 (e.g., c=0). However, in other examples, the positive slope may be greater than 0, more than 1, or another positive slope. Similarly, in other examples, the offset may be less than 0, more than 1, or another offset.

Figure 10:
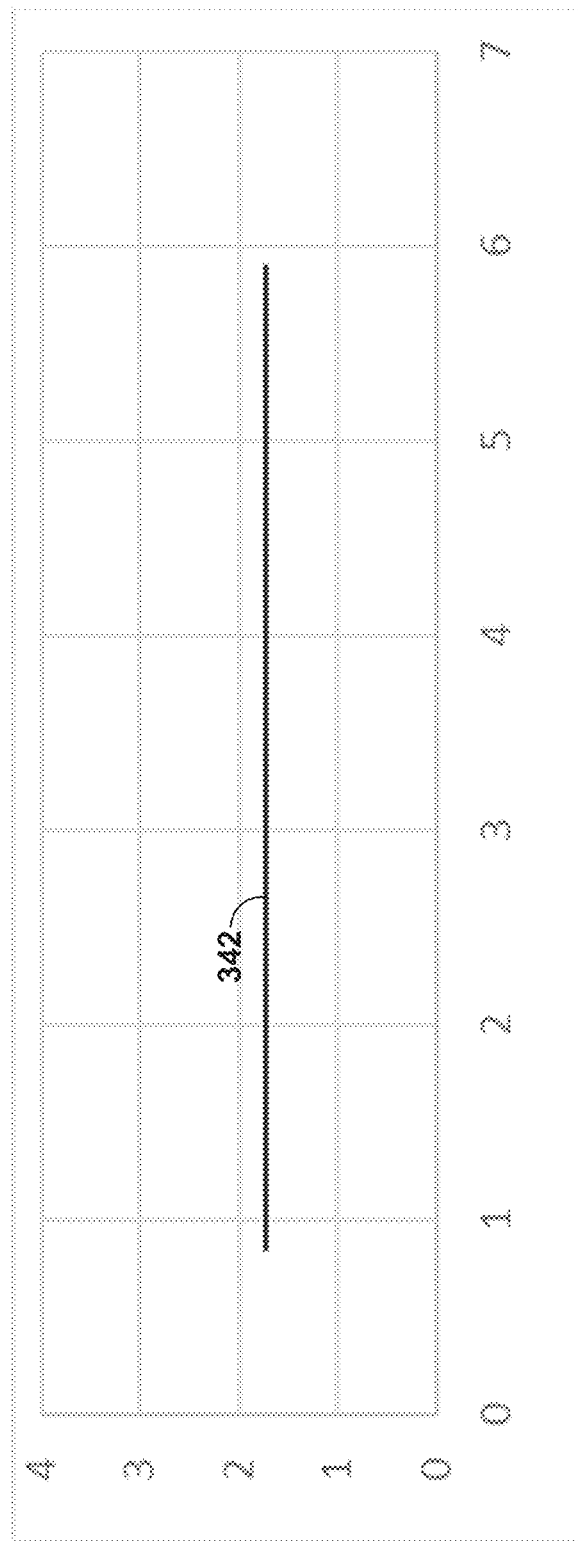
FIG. 10 is a conceptual diagram illustrating an example best fit line representing constant usage of a software application over time, according to techniques of this disclosure.

FIG. 10 is a conceptual diagram illustrating an example best fit line 342 representing constant usage of a software application over time, according to techniques of this disclosure. The abscissa axis (e.g., x-axis) of FIG. 10 represents time and the ordinate axis (e.g., y-axis) of FIG. 10 represents application bytes as y-axis.

In the example of FIG. 10, controller device 10 may determine a slope of best fit line 342. For example, controller device 10 may determine 'm' when the best fit line is determined using linear regression (e.g., y=mx+c), where 'm' is a linear slope. In this example, the slope has a value of 0 (e.g., m=0) with an offset of 1.75 (e.g., c=1.75). However, in other examples, the offset may be less than 1.75, more than 1.75, or another offset.

Figure 11:
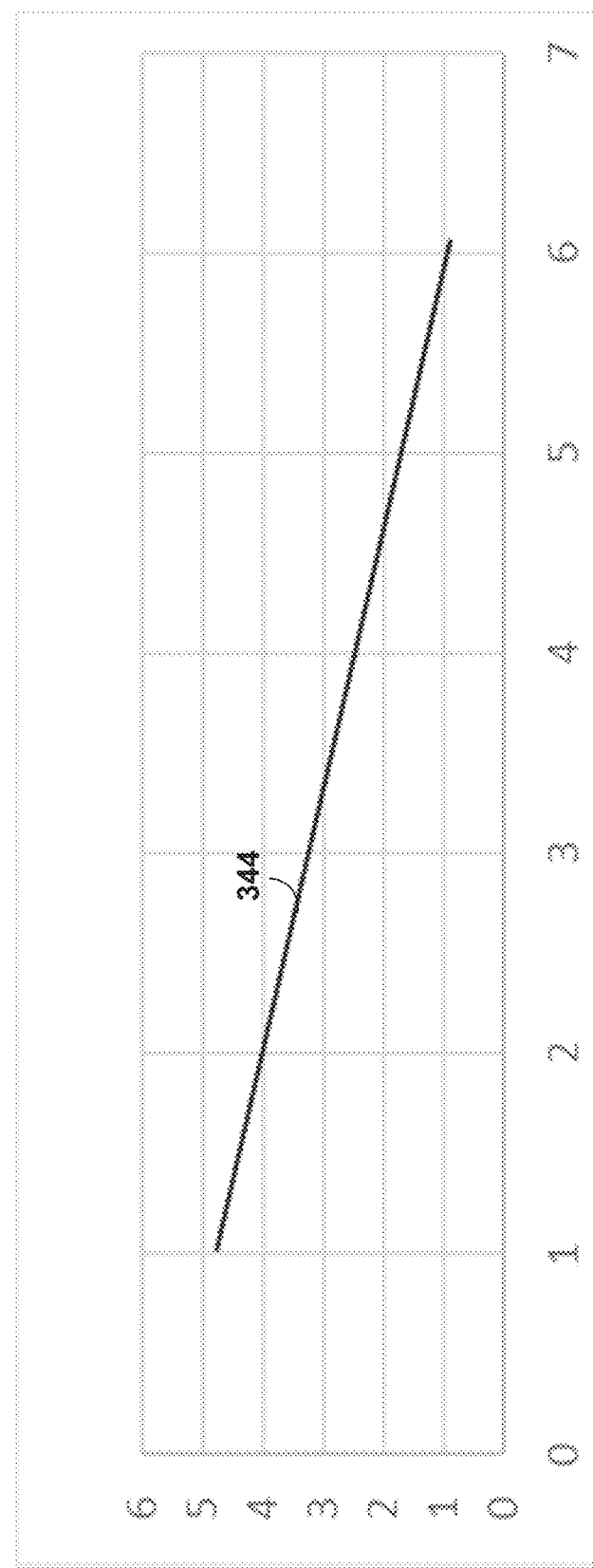
FIG. 11 is a conceptual diagram illustrating an example best fit line representing a decreasing usage of a software application over time, according to techniques of this disclosure.

FIG. 11 is a conceptual diagram illustrating an example best fit line 344 representing a decreasing usage of a software application over time, according to techniques of this disclosure. The abscissa axis (e.g., x-axis) of FIG. 11 represents time and the ordinate axis (e.g., y-axis) of FIG. 11 represents application bytes as y-axis.

In the example of FIG. 11, controller device 10 may determine a slope of best fit line 344. For example, controller device 10 may determine 'm' when the best fit line is determined using linear regression (e.g., y=mx+c), where 'm' is a linear slope. In this example, the slope has a value of −1 (e.g., m=−1) with an offset of 5 (e.g., c=5). However, in other examples, the negative slope may be less than 0, more than −1, or another negative slope. Similarly, in other examples, the offset may be less than 5, more than 5, or another offset.

Figure 12:
FIG. 12 is a conceptual diagram illustrating an example best fit line of usage of a software application over time for a first site, according to techniques of this disclosure.

FIG. 12 is a conceptual diagram illustrating example best fit line 362 of usage of a software application over time for a first site, according to techniques of this disclosure. The abscissa axis (e.g., x-axis) of FIG. 12 represents time and the ordinate axis (e.g., y-axis) of FIG. 12 represents application bytes as y-axis.

In the example of FIG. 12, controller device 10 may determine a slope of best fit line 362 of usage of a software application over time for the first site. For example, controller device 10 may determine 'm' when the best fit line is determined using linear regression (e.g., y=mx+c), where 'm' is a linear slope. In this example, the slope of best fit line 362 has a value of 0.5 (e.g., m=0.5) with an offset of 0 (e.g., c=0).

In the example of FIG. 12, controller device 10 may group sites in an order based on slope. For example, controller device 10 may group all sites which have a positive slope for the application into Group-A. Positive slope may refer to a representation of increasing usage of application over time. For example, controller device 10 may group the first site into Group-A in response to determining that best fit line 362 of a particular software application over time for the first site has a slope (e.g., 0.5) that is greater than or equal to zero.

Figure 13:
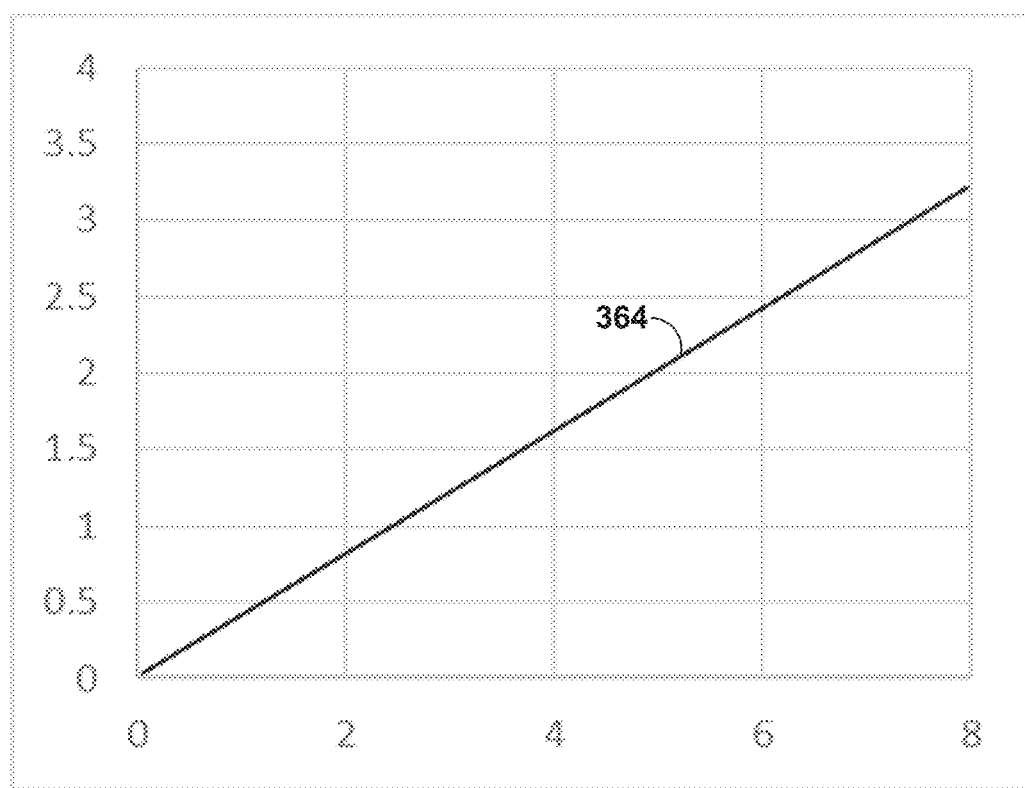
FIG. 13 is a conceptual diagram illustrating an example best fit line of usage of a software application over time for a second site, according to techniques of this disclosure.

FIG. 13 is a conceptual diagram illustrating an example best fit line 364 of usage of a software application over time for a second site, according to techniques of this disclosure. The abscissa axis (e.g., x-axis) of FIG. 13 represents time and the ordinate axis (e.g., y-axis) of FIG. 13 represents application bytes as y-axis.

In the example of FIG. 13, controller device 10 may determine a slope of best fit line 364 of usage of a software application over time for the second site. For example, controller device 10 may determine 'm' when the best fit line is determined using linear regression (e.g., y=mx+c), where 'm' is a linear slope. In this example, the slope of best fit line 364 has a value of 0.4 (e.g., m=0.4) with an offset of 0 (e.g., c=0). In the example of FIG. 13, controller device 10 may group the second site into Group-A in response to determining that best fit line 364 of a particular software application over time for the second site has a slope (e.g., 0.4) that is greater than or equal to zero.

Figure 14:
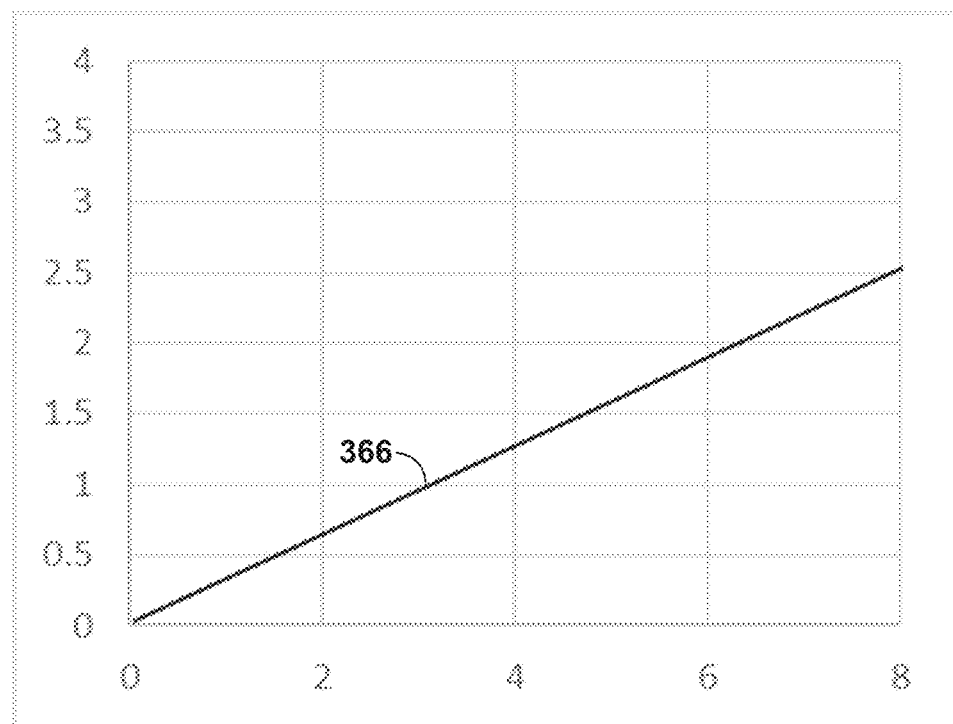
FIG. 14 is a conceptual diagram illustrating an example best fit line of usage of a software application over time for a third site, according to techniques of this disclosure.

FIG. 14 is a conceptual diagram illustrating an example best fit 366 line of usage of a software application over time for a third site, according to techniques of this disclosure. The abscissa axis (e.g., x-axis) of FIG. 14 represents time and the ordinate axis (e.g., y-axis) of FIG. 14 represents application bytes as y-axis.

In the example of FIG. 14, controller device 10 may determine a slope of best fit line 366 of usage of a software application over time for the third site. For example, controller device 10 may determine 'm' when the best fit line is determined using linear regression (e.g., y=mx+c), where 'm' is a linear slope. In this example, the slope of best fit line 366 has a value of 0.3 (e.g., m=0.3) with an offset of 0 (e.g., c=0). In the example of FIG. 14, controller device 10 may group the third site into Group-A in response to determining that best fit line 366 of a particular software application over time for the third site has a slope (e.g., 0.3) that is greater than or equal to zero.

Figure 15:
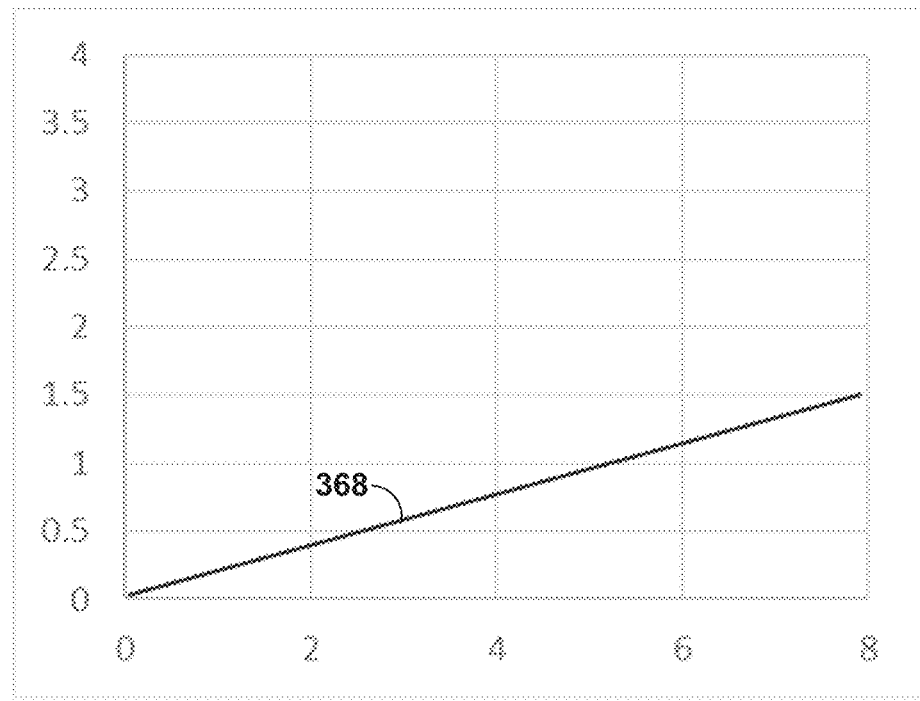
FIG. 15 is a conceptual diagram illustrating an example best fit line of usage of a software application over time for a fourth site, according to techniques of this disclosure.

FIG. 15 is a conceptual diagram illustrating an example best fit line 368 of usage of a software application over time for a fourth site, according to techniques of this disclosure. The abscissa axis (e.g., x-axis) of FIG. 15 represents time and the ordinate axis (e.g., y-axis) of FIG. 15 represents application bytes as y-axis.

In the example of FIG. 15, controller device 10 may determine a slope of best fit line 368 of usage of a software application over time for the fourth site. For example, controller device 10 may determine 'm' when the best fit line is determined using linear regression (e.g., y=mx+c), where 'm' is a linear slope. In this example, the slope of best fit line 368 has a value of 0.2 (e.g., m=0.2) with an offset of 0 (e.g., c=0). In the example of FIG. 15, controller device 10 may group the fourth site into Group-A in response to determining that best fit line 368 of a particular software application over time for the fourth site has a slope (e.g., 0.2) that is greater than or equal to zero.

Figure 16:
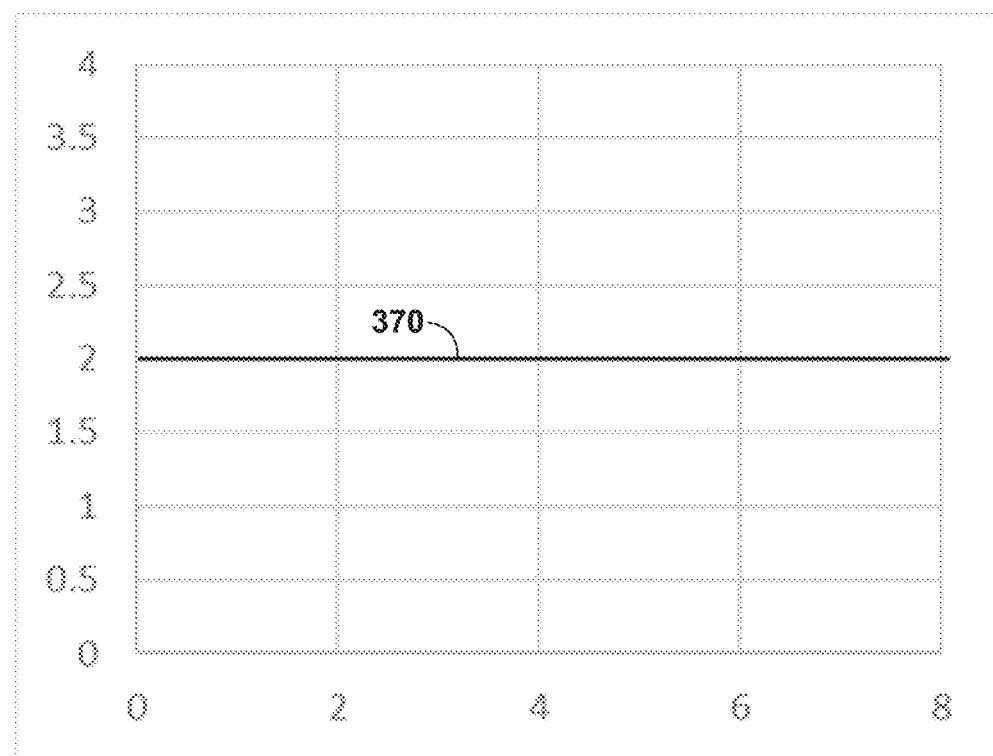
FIG. 16 is a conceptual diagram illustrating an example best fit line of usage of a software application over time for a fifth site, according to techniques of this disclosure.

FIG. 16 is a conceptual diagram illustrating an example best fit line of usage of a software application over time for a fifth site, according to techniques of this disclosure. The abscissa axis (e.g., x-axis) of FIG. 16 represents time and the ordinate axis (e.g., y-axis) of FIG. 16 represents application bytes as y-axis.

In the example of FIG. 16, controller device 10 may determine a slope of best fit line 370 of usage of a software application over time for the fifth site. For example, controller device 10 may determine 'm' when the best fit line is determined using linear regression (e.g., y=mx+c), where 'm' is a linear slope. In this example, the slope of best fit line 370 has a value of 0 (e.g., m=0) with an offset of 2 (e.g., c=2). In the example of FIG. 16, controller device 10 may group the fifth site into Group-A in response to determining that best fit line 370 of a particular software application over time for the fifth site has a slope (e.g., 0) that is greater than or equal to zero.

Figure 17:
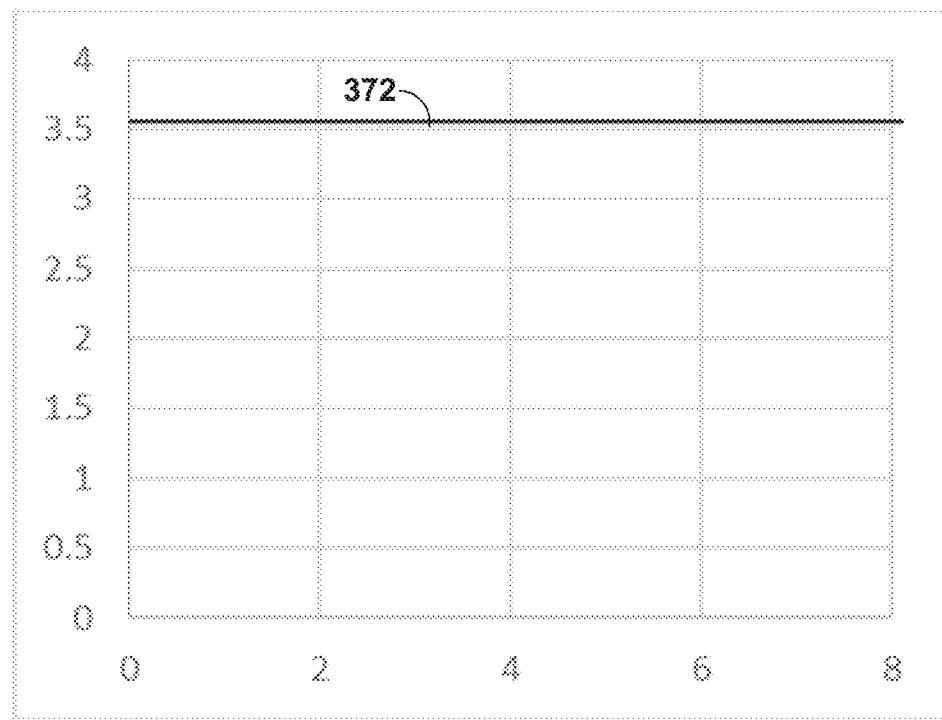
FIG. 17 is a conceptual diagram illustrating an example best fit line of usage of a software application over time for a sixth site, according to techniques of this disclosure.

FIG. 17 is a conceptual diagram illustrating an example best fit line 372 of usage of a software application over time for a sixth site, according to techniques of this disclosure. The abscissa axis (e.g., x-axis) of FIG. 17 represents time and the ordinate axis (e.g., y-axis) of FIG. 17 represents application bytes as y-axis.

In the example of FIG. 17, controller device 10 may determine a slope of best fit line 372 of usage of a software application over time for the sixth site. For example, controller device 10 may determine 'm' when the best fit line is determined using linear regression (e.g., y=mx+c), where 'm' is a linear slope. In this example, the slope of best fit line 372 has a value of 0 (e.g., m=0) with an offset of 3.5 (e.g., c=3.5). In the example of FIG. 16, controller device 10 may group the sixth site into Group-A in response to determining that best fit line 372 of a particular software application over time for the sixth site has a slope (e.g., 0) that is greater than or equal to zero.

Controller device 10 may order sites in Group-A based on the application traffic usage. In some examples, controller device 10 may be configured to determine a maximum amount of data transmitted to each site and for use by the software application using a best fit line for each site. For example, controller device 10 may determine that best fit line 362 of usage of a software application over time for the first site indicates a maximum amount of data transmitted to the first site and for use by a particular software application is 4. In this example, controller device 10 may determine that best fit line 364 of usage of a software application over time for the second site indicates a maximum amount of data transmitted to the second site and for use by a particular software application is 3.25. Controller device 10 may determine that best fit line 366 of usage of a software application over time for the third site indicates a maximum amount of data transmitted to the third site and for use by a particular software application is 2.5.

Similarly, controller device 10 may determine that best fit line 368 of usage of a software application over time for the fourth site indicates a maximum amount of data transmitted to the fourth site and for use by a particular software application is 1.5. Controller device 10 may determine that best fit line 370 of usage of a software application over time for the fifth site indicates a maximum amount of data transmitted to the fifth site and for use by a particular software application is 2 and/or controller device 10 may determine that best fit line 372 of usage of a software application over time for the sixth site indicates a maximum amount of data transmitted to the sixth site and for use by a particular software application is 3.5. As such, controller device 10 may order the sites of FIGS. 12-16 into an ordered list of the first site of FIG. 12, the sixth site of FIG. 17, the second site of FIG. 13, the third site of FIG. 14, the fifth site of FIG. 16., and the fourth site of FIG. 15.

Figure 18:
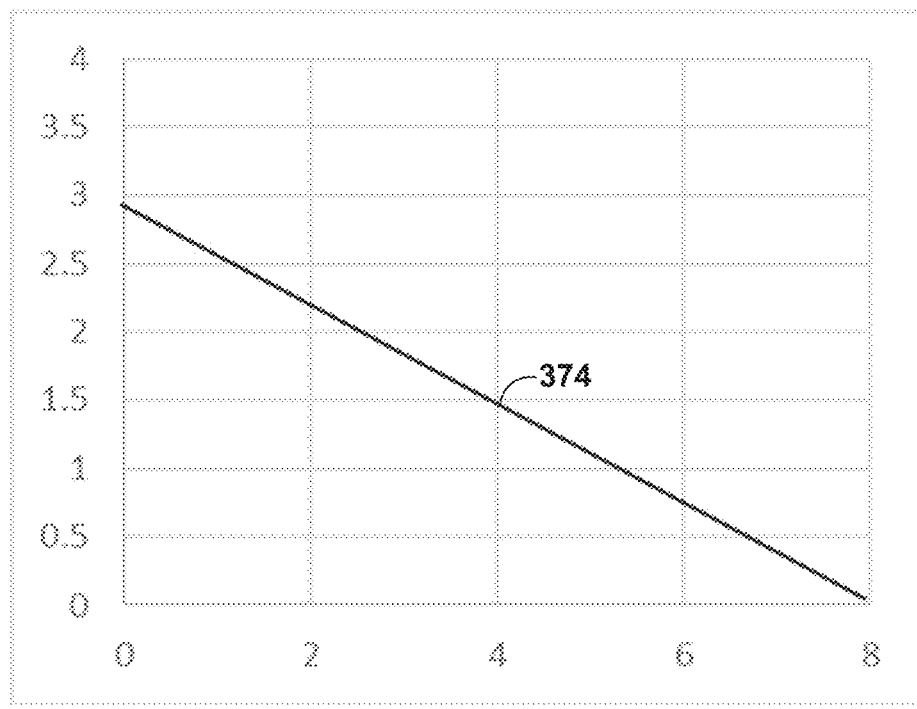
FIG. 18 is a conceptual diagram illustrating an example best fit line of usage of a software application over time for a seventh site, according to techniques of this disclosure.

FIG. 18 is a conceptual diagram illustrating example best fit line 374 of usage of a software application over time for a seventh site, according to techniques of this disclosure. The abscissa axis (e.g., x-axis) of FIG. 18 represents time and the ordinate axis (e.g., y-axis) of FIG. 18 represents application bytes as y-axis.

In the example of FIG. 18, controller device 10 may determine a slope of best fit line 374 of usage of a software application over time for the seventh site. For example, controller device 10 may determine 'm' when the best fit line is determined using linear regression (e.g., y=mx+c), where 'm' is a linear slope. In this example, the slope of best fit line 374 has a value of −0.4 (e.g., m=−0.4) with an offset of 3 (e.g., c=3).

In the example of FIG. 18, controller device 10 may group sites in an order based on a negative slope. For example, controller device 10 may group all sites which have a negative slope for the application into Group-B. A negative slope may indicate a software application usage is decreasing. In the example of FIG. 18, controller device 10 may group the seventh site into Group-B in response to determining that best fit line 374 of a particular software application over time for the seventh site has a slope (e.g., −0.4) that is not greater than or equal to zero.

Figure 19:
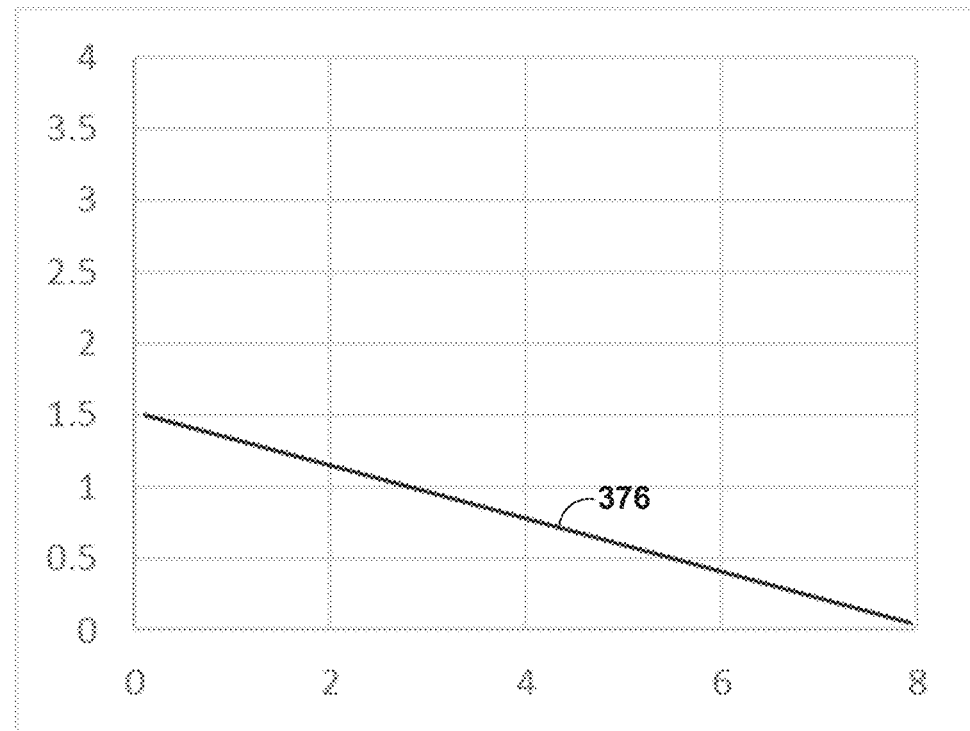
FIG. 19 is a conceptual diagram illustrating an example best fit line of usage of a software application over time for an eight site, according to techniques of this disclosure.

FIG. 19 is a conceptual diagram illustrating example best fit line 376 of usage of a software application over time for an eighth site, according to techniques of this disclosure. The abscissa axis (e.g., x-axis) of FIG. 19 represents time and the ordinate axis (e.g., y-axis) of FIG. 19 represents application bytes as y-axis.

In the example of FIG. 19, controller device 10 may determine a slope of best fit line 376 of usage of a software application over time for the eight site. For example, controller device 10 may determine 'm' when the best fit line is determined using linear regression (e.g., y=mx+c), where 'm' is a linear slope. In this example, the slope of best fit line 376 has a value of −0.2 (e.g., m=−0.2) with an offset of 1.5 (e.g., c=1.5). In the example of FIG. 19, controller device 10 may group the eight site into Group-B in response to determining that best fit line 376 of a particular software application over time for the seventh site has a slope (e.g., −0.2) that is not greater than or equal to zero.

Controller device 10 may order sites in Group-B based on the application traffic usage. In some examples, controller device 10 may be configured to determine a maximum amount of data transmitted to each site and for use by the software application using a best fit line for each site. For example, controller device 10 may determine that best fit line 374 of usage of a software application over time for the seventh site indicates a maximum amount of data transmitted to the seventh site and for use by a particular software application is 3. In this example, controller device 10 may determine that best fit line 376 of usage of a software application over time for the eighth site indicates a maximum amount of data transmitted to the eighth site and for use by a particular software application is 1.5. As such, controller device 10 may order the sites of FIGS. 18 and 19 into an ordered list of the seventh site of FIG. 18 and the eighth site of FIG. 19.

Controller device 10 may group all remaining sites which have no usage of the application into Group-C. For example, GROUP-C may include a ninth site and a tenth site that have no usage of the application. For example, controller device 10 may order the sites of FIGS. 18 and 19 into an ordered list of the ninth site and a tenth site.

After determining all the Groups, controller device 10 may be configured to order the sites such that sites grouped in Group-A (which is the group of all the sites that has higher usage of the application) are applied with the policy change followed by Group-B and Group-C as shown in Table 1.

TABLE 1

| Priority-Index | Site Name |
| --- | --- |
| 1 | first site of FIG. 12 |
| 2 | sixth site of FIG. 17 |
| 3 | second site of FIG. 13 |
| 4 | third site of FIG. 14 |
| 5 | fifth site of FIG. 16 |
| 6 | fourth site of FIG. 15 |
| 7 | seventh site of FIG. 18 |
| 8 | eighth site of FIG. 19 |
| 9 | ninth site |
| 10 | tenth site |

Controller device 10 may apply a policy intent based on the priority index of Table 1. In this example, only one application is used for explaining the solution. However, similar techniques may be applied when multiple applications are involved. For example, controller device 10 may dynamically order sites based usage trends of multiple applications selected in rules of a SD-WAN policy for a particular time frame.

Figure 20:
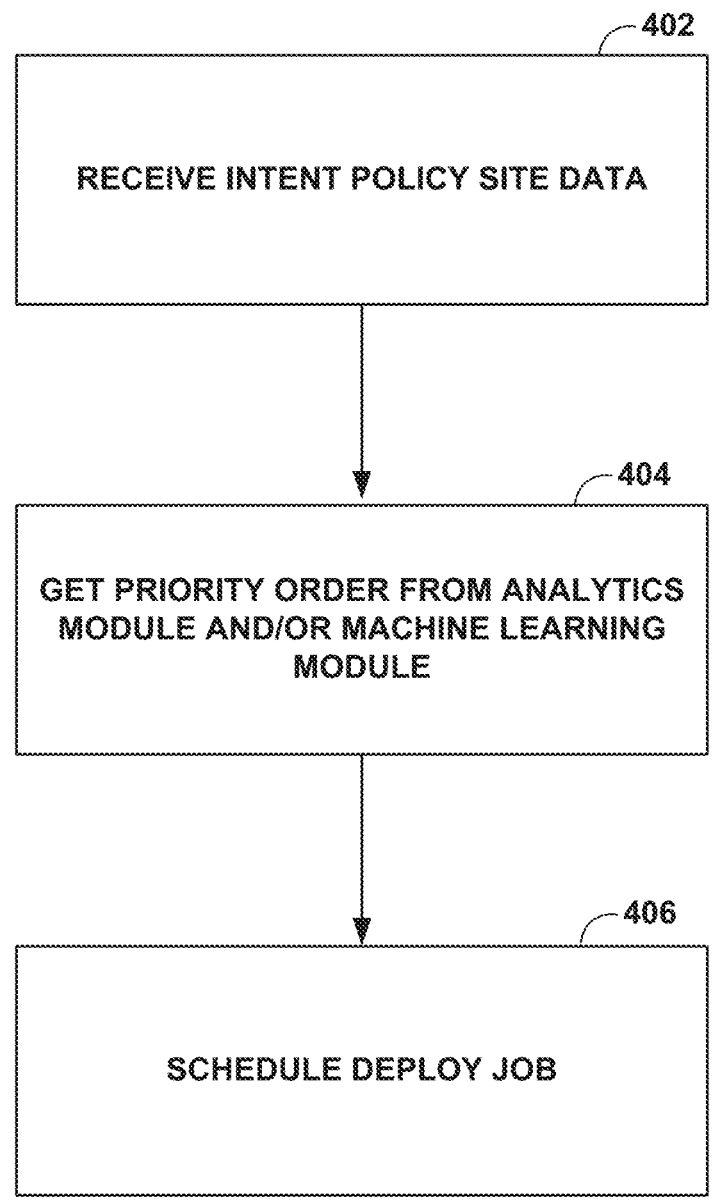
FIG. 20 is a flowchart illustrating an example process that may be performed by a policy mapper and/or scheduler for prioritizing policy updates to schedule a deploy job, according to techniques of this disclosure.

FIG. 20 is a flowchart illustrating an example process that may be performed by a policy mapper and/or scheduler for prioritizing policy updates to schedule a deploy job. FIG. 20 is discussed with respect to FIGS. 1-19 for example purposes only. Controller device 10 may receive intent policy site data (402). For example, administrator 12 may output a request to policy mapper 256 and/or scheduler 258 for deploying set of policies on sites 13 managed by controller device 10. Controller device 10 may get a priority order from analytics module and/or machine learning module 260 (404). Example details of step 404 are discussed in FIG. 21. Scheduler 262 may schedule the deploy jobs based on the priority order (406). For example, scheduler 262 may arrange the sites in the priority order and a configure each site according to low-level configuration data in an order specified by the priority order.

Figure 21:
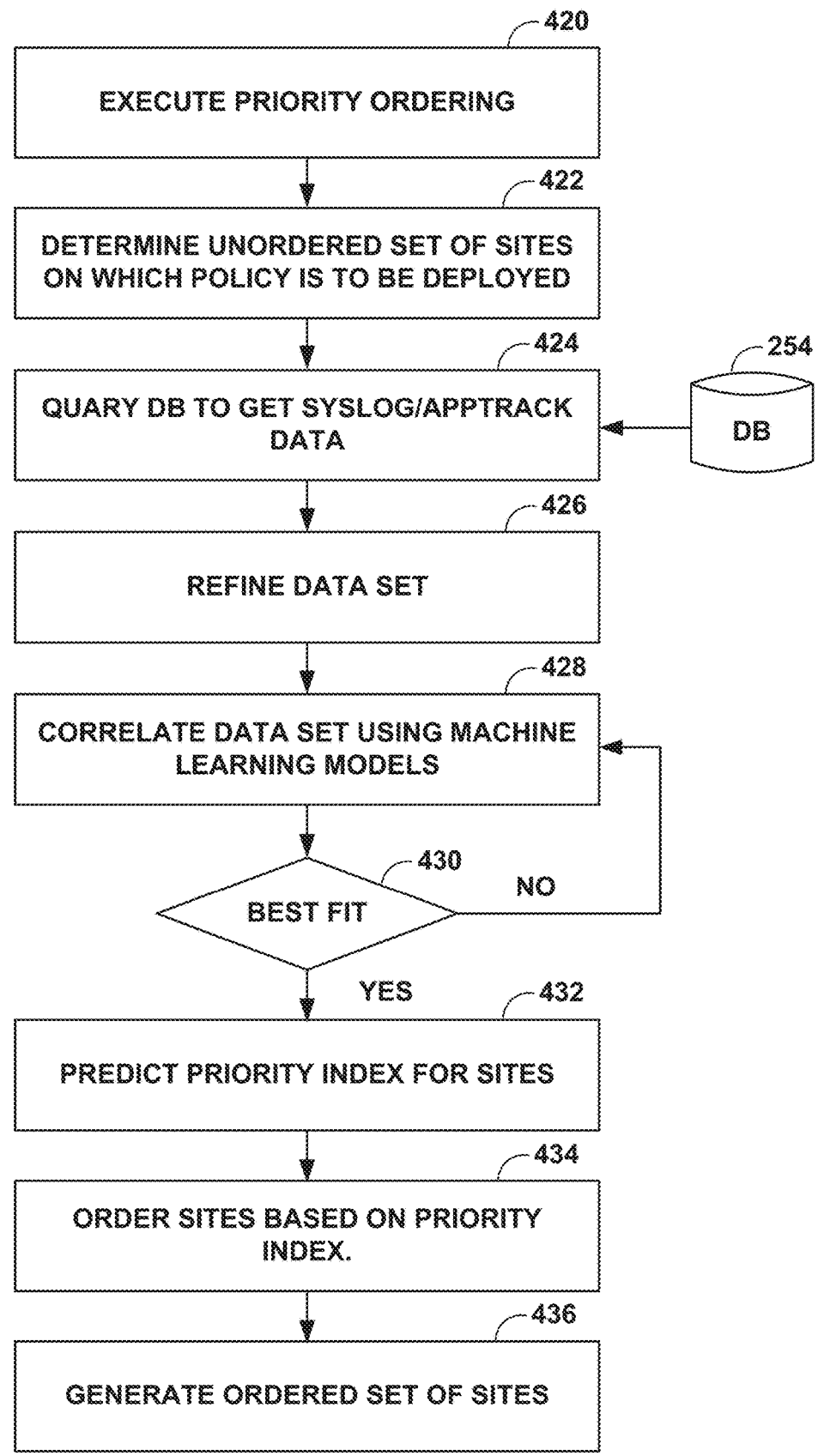
FIG. 21 is a flowchart illustrating an example process that may be performed by a policy mapper and/or scheduler for prioritizing policy updates to determine a priority order of deploy jobs, according to techniques of this disclosure.

FIG. 21 is a flowchart illustrating an example process that may be performed by a policy mapper and/or scheduler for prioritizing policy updates to determine a priority order of deploy jobs. FIG. 21 is discussed with respect to FIGS. 1-20 for example purposes only.

Analytics module and/or machine learning module 260 may execute priority ordering (420). For example, as part of job execution, a policy mapper 256 and/or scheduler 258 may refer to analytics module and/or machine learning module 260 for performing the priority ordering. Analytics module and/or machine learning module 260 may determine an unordered set of sites on which a policy is to be deployed (422). Analytics module and/or machine learning module 260 may query DB 264 to get the site related data (e.g., apptrack/syslog data) stored in DB 264 (424).

Analytics module and/or machine learning module 260 may refine the data sets to arrange in the desired form (426). Analytics module and/or machine learning module 260 may find a correlation in data set (e.g., application traffic packets, bytes, throughput, time, etc.) (428). Analytics module and/or machine learning module 260 may find the best fit model for the available data set (e.g., linear regression, non-linear regression neural logic, etc.) that minimizes error (430). In response to determining that a best fit model does not minimize error ("NO" of step 430), analytics module and/or machine learning module 260 may use another best fit model and repeat step 430.

In response, however, to determining that a best fit model does minimize error ("YES" of step 430), analytics module and/or machine learning module 260 may predict a priority index for the sites (432). For example, analytics module and/or machine learning module 260 may determine a priority index for available sites based on the best fit model output for each site. Analytics module and/or machine learning module 260 may order the sites based on the priority order (434) to generate an ordered set of sites on which an intent policy is to be deployed (436).

Figure 22:
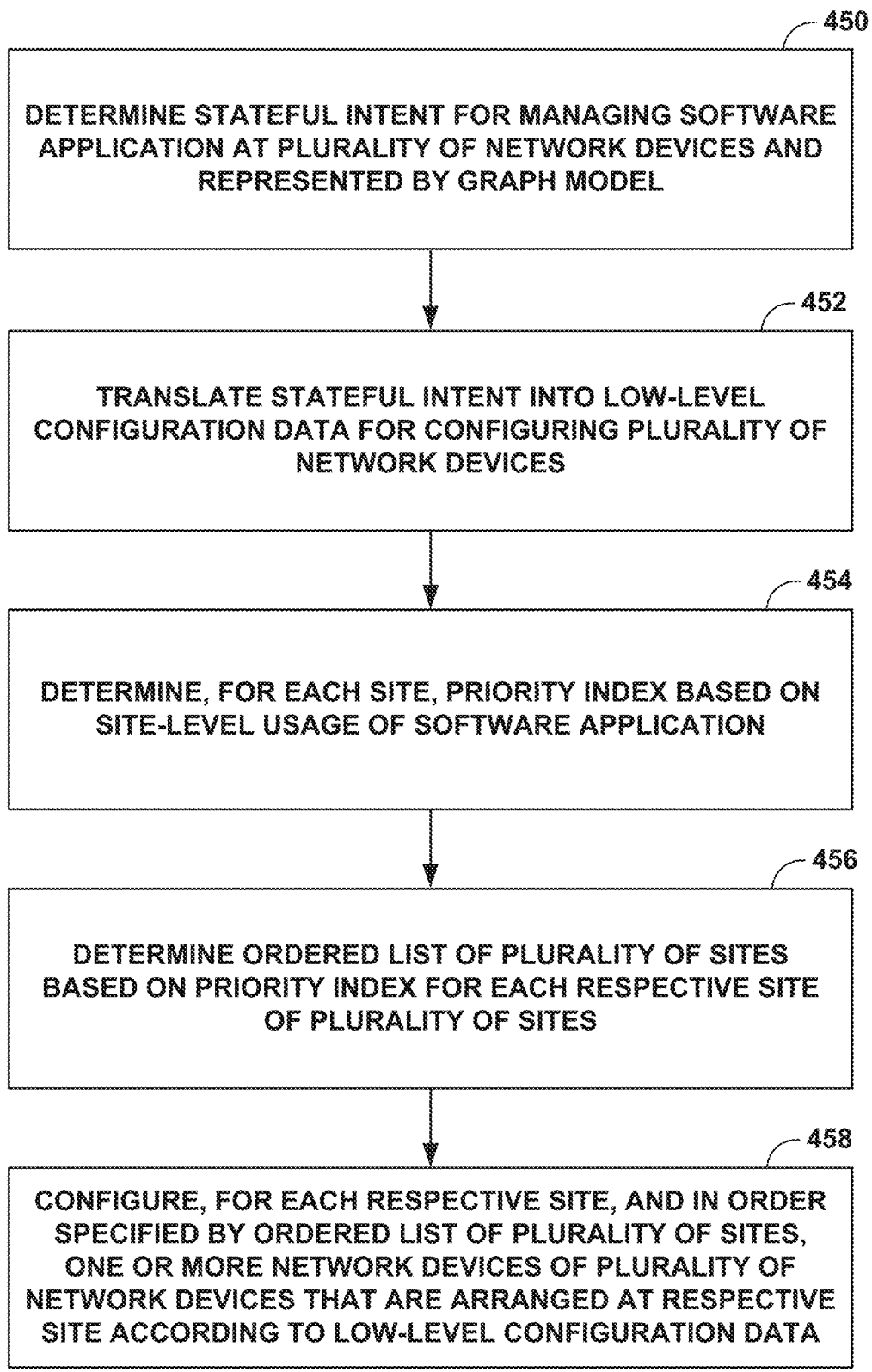
FIG. 22 is a flowchart illustrating an example process for determining an ordered list of a plurality of sites to prioritize intent updates, according to techniques of this disclosure.

FIG. 22 is a flowchart illustrating an example process for determining an ordered list of a plurality of sites to prioritize intent updates, according to techniques of this disclosure. FIG. 22 is discussed with respect to FIGS. 1-21 for example purposes only. Controller device 10 may determine a stateful intent for managing a software application at the plurality of network devices (e.g., elements 14) and represented by a graph model (450). Controller device 10 may translate the stateful intent into low-level configuration data for configuring the plurality of network devices (452).

Controller device 10 may determine, for each respective site of the plurality of sites, a priority index based on a site-level usage of the software application at the respective site (454). For example, analytics module and/or machine learning module 260 may access one or more application logs (e.g., Apptrack) to determine, for each event at a site, a respective amount of data transmitted to the site and for use by the software application. In some examples, analytics module and/or machine learning module 260 may access one or more network logs (e.g., syslogs) to determine, for each event, a respective time the respective amount of data was transmitted to the site and for use by the software application. Controller device 10 may generate a plot using the respective amount of data transmitted and the respective times of each event (see FIG. 7).

Controller device 10 may determine a best fit line of the events using linear regression (see FIG. 8), non-linear regression, machine learning, or another process. In some examples, controller device 10 may determine a group for each site using a slope of the best fit line. For example, controller device 10 may assign each site having a best fit line with a positive slope or constant slope to Group-A (see FIGS. 12-17). For instance, controller device 10 may assign a site to the group-A when a best fit line for the site comprises a positive slope. In some instances, controller device 10 may assign a site to the group-A when a best fit line for the site comprises a constant slope. In some examples, controller device 10 may assign each site having a best fit line with a negative slope to Group-B (see FIGS. 18, 19) and assign each site having no usage to Group-C. For instance, controller device 10 may assign a site to the group-B when a best fit line for a site comprises a negative slope. Sites within a group may be assigned a priority index based on a maximum amount of data transmitted to the site and for use by the software application indicated by the best fit line.

Controller device 10 may determine, an ordered list of the plurality of sites based on the priority index for each respective site of the plurality of sites (456). Controller device 10 may configure, for each respective site of the plurality of sites, and in an order specified by the ordered list of the plurality of sites, one or more network devices of the plurality of network devices that are arranged at the respective site according to the low-level configuration data (458).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
    determining, by a controller device that manages a plurality of network devices arranged at a plurality of sites operating in different geographical locations, a stateful intent for managing a software application at the plurality of network devices and represented by a graph model;
    translating, by the controller device, the stateful intent into low-level configuration instructions for configuring the plurality of network devices;
    determining, by the controller device, using one or more logs for the software application, a plurality of best fit lines that represents, for each respective time of the plurality of times, a respective amount of data transmitted to the software application at each respective site of the plurality of sites operating in different geographical locations;
    determining, by the controller device, for each respective site of the plurality of sites operating in different geographical locations, a priority index for configuring the plurality of network devices according to the low-level configuration instructions using the plurality of best fit lines that represents, for each respective time of the plurality of times, the respective amount of data transmitted to the software application at each respective site of the plurality of sites operating in different geographical locations;
    determining, by the controller device, an ordered list of the plurality of sites based on the priority index for each respective site of the plurality of sites operating in different geographical locations; and
    configuring, by the controller device, for each respective site of the plurality of sites, and in an order specified by the ordered list of the plurality of sites operating in different geographical locations, one or more network devices of the plurality of network devices that are arranged at the respective site according to the low-level configuration instructions.

2. The method of claim 1, wherein the one or more logs comprises one or more application logs for a site of the plurality of sites, wherein determining the plurality of best fit lines comprises:
    determining, by the controller device, and for each event of a plurality of events at a site of the plurality of sites, the respective amount of data transmitted to the software application at the site using the one or more application logs for the site.

3. The method of claim 2, comprising:
    determining, by the controller device, and using one or more network logs for the site, for each event of the plurality of events, a respective time the respective amount of data was transmitted to the software application at the site.

4. The method of claim 1, wherein determining the priority index comprises:
    assigning a group of a plurality of groups to a site of the plurality of sites based on a best fit line of the plurality of best fit lines; and
    determining the priority index for the site based on the group assigned to the site.

5. The method of claim 4,
    wherein the best fit line comprises a negative slope; and
    wherein determining the priority index comprises assigning, when the best fit line comprises the negative slope, the site to the group.

6. The method of claim 4,
    wherein the best fit line comprises a positive slope; and
    wherein determining the priority index comprises assigning, when the best fit line comprises the positive slope, the site to the group.

7. The method of claim 4,
    wherein the best fit line comprises a constant slope; and
    wherein determining the priority index comprises assigning, when the best fit line comprises the constant slope, the site to the group.

8. The method of claim 4, wherein determining the priority index comprises:
    determining a maximum amount of data transmitted to the software application at the site using the best fit line; and
    determining the priority index for the site further based on the maximum amount of data transmitted to the software application at the site.

9. The method of claim 1, wherein determining a best fit line of the plurality of best fit lines comprises applying one or more of linear regression, non-linear regression, and machine learning.

10. The method of claim 1, wherein the configuring comprises causing the low-level configuration instructions to be applied to the one or more network devices at a first site of the plurality of sites before the low-level configuration instructions are applied to the one or more network devices at a second site of the plurality of sites operating when the ordered list specifies that the first site has a higher priority for the software application than the second site.

11. A controller device that manages a plurality of network devices arranged at a plurality of sites operating in different geographical locations, the controller device comprising one or more processing units implemented in circuitry and configured to:
    determine a stateful intent for managing a software application at the plurality of network devices and represented by a graph model;

translate the stateful intent into low-level configuration instructions for configuring the plurality of network devices;

determine, using one or more logs for the software application, a plurality of best fit lines that represents, for each respective time of the plurality of times, a respective amount of data transmitted to the software application at each respective site of the plurality of sites operating in different geographical locations;

determine, for each respective site of the plurality of sites operating in different geographical locations, a priority index for configuring the plurality of network devices according to the low-level configuration instructions using the plurality of best fit lines that represents, for each respective time of the plurality of times, the respective amount of data transmitted to the software application at each respective site of the plurality of sites operating in different geographical locations;

determine an ordered list of the plurality of sites based on the priority index for each respective site of the plurality of sites operating in different geographical locations; and configure, for each respective site of the plurality of sites, and in an order specified by the ordered list of the plurality of sites operating in different geographical locations, one or more network devices of the plurality of network devices that are arranged at the respective site according to the low-level configuration instructions.

12. The controller device of claim 11, wherein the one or more logs comprises one or more application logs for a site of the plurality of sites and wherein to determine the plurality of best fit lines, the one or more processing units are configured to:

determine, for each event of a plurality of events at a site of the plurality of sites, the respective amount of data transmitted to the software application at a site of the plurality of sites using the one or more application logs for the site.

13. The controller device of claim 12, wherein the one or more processing units are configured to:

determine, using one or more network logs for the site, for each event of the plurality of events, a respective time the respective amount of data was transmitted to the software application at the site.

14. The controller device of claim 11, wherein, to determine the priority index, the one or more processing units are configured to:

assign a group of a plurality of groups to a site of the plurality of sites based on a best fit line of the plurality of best fit lines; and determine the priority index for the site based on the group assigned to the site.

15. The controller device of claim 14, wherein the best fit line comprises a negative slope; and wherein, to determine the priority index, the one or more processing units are configured to assign, when the best fit line comprises the negative slope, the site to the group.

16. The controller device of claim 14, wherein the best fit line comprises a positive slope; and wherein, to determine the priority index, the one or more processing units are configured to assign, when the best fit line comprises the positive slope, the site to the group.

17. The controller device of claim 14, wherein the best fit line comprises a constant slope; and wherein, to determine the priority index, the one or more processing units are configured to assign, when the best fit line comprises the constant slope, the site to the group.

18. A non-transitory computer-readable storage medium having stored thereon instructions that, when executed, cause one or more processing units of a controller device that manages a plurality of network devices arranged at a plurality of sites operating in different geographical locations to:

determine a stateful intent for managing a software application at the plurality of network devices operating in different geographical locations and represented by a graph model;

translate the stateful intent into low-level configuration instructions for configuring the plurality of network devices;

determine, using one or more logs for the software application, a plurality of best fit lines that represents, for each respective time of the plurality of times, a respective amount of data transmitted to the software application at each respective site of the plurality of sites operating in different geographical locations;

determine, for each respective site of the plurality of sites operating in different geographical locations, a priority index for configuring the plurality of network devices according to the low-level configuration instructions using the plurality of best fit lines that represents, for each respective time of the plurality of times, the respective amount of data transmitted to the software application at each respective site of the plurality of sites operating in different geographical locations;

determine an ordered list of the plurality of sites based on the priority index for each respective site of the plurality of sites operating in different geographical locations; and configure, for each respective site of the plurality of sites, and in an order specified by the ordered list of the plurality of sites operating in different geographical locations, one or more network devices of the plurality of network devices that are arranged at the respective site according to the low-level configuration instructions.

* * * * *